(12) United States Patent
Ferguson et al.

(10) Patent No.: US 10,507,787 B2
(45) Date of Patent: Dec. 17, 2019

(54) SYSTEM AND MECHANISM FOR UPSELLING PRODUCTS ON AUTONOMOUS VEHICLES

(71) Applicant: Nuro, Inc., Mountain View, CA (US)

(72) Inventors: David Ferguson, San Francisco, CA (US); Jiajun Zhu, Palo Alto, CA (US); Pichayut Jirapinyo, San Francisco, CA (US); Nan Ransohoff, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 16/046,978

(22) Filed: Jul. 26, 2018

(65) Prior Publication Data
US 2019/0034858 A1   Jan. 31, 2019

Related U.S. Application Data

(60) Provisional application No. 62/538,538, filed on Jul. 28, 2017.

(51) Int. Cl.
*G06Q 10/08* (2012.01)
*B60R 21/34* (2011.01)
(Continued)

(52) U.S. Cl.
CPC ............... *B60R 21/34* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/36* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01);
(Continued)

(58) Field of Classification Search
CPC ....... G06Q 10/08; G06Q 10/083; G06Q 20/20
USPC .......................................... 705/16, 26.1, 330
See application file for complete search history.

(56) References Cited

U.S. PATENT DOCUMENTS

| | | |
|---|---|---|
| 3,064,252 A | 11/1962 | Varela |
| 4,766,548 A | 8/1988 | Cedrone et al. |

(Continued)

FOREIGN PATENT DOCUMENTS

| | | |
|---|---|---|
| JP | H036407 A | 1/1991 |
| JP | 2001256576 A | 9/2001 |

(Continued)

OTHER PUBLICATIONS

Co-pending U.S. Appl. No. 16/119,939, filed Aug. 31, 2018.
(Continued)

*Primary Examiner* — Florian M Zeender
*Assistant Examiner* — Christopher R Buchanan

(57) ABSTRACT

Provided herein is an autonomous or semi-autonomous vehicle fleet comprising a plurality of autonomous or semi-autonomous vehicles for containing, securing, and delivering at least one of a first item and at least one of a second item after a customer places an order for a first item, operating autonomously or semi-autonomously, and a fleet management module for coordination of the autonomous or semi-autonomous vehicle fleet.

23 Claims, 18 Drawing Sheets

(51) Int. Cl.

| | | |
|---|---|---|
| *B65G 67/24* | (2006.01) | |
| *G01C 21/34* | (2006.01) | |
| *G05D 1/00* | (2006.01) | |
| *G06K 9/00* | (2006.01) | |
| *G05D 1/02* | (2006.01) | |
| *G06Q 10/06* | (2012.01) | |
| *G06Q 50/28* | (2012.01) | |
| *G06Q 30/06* | (2012.01) | |
| *G06Q 50/30* | (2012.01) | |
| *G07F 17/00* | (2006.01) | |
| *G08G 1/00* | (2006.01) | |
| *B60P 1/36* | (2006.01) | |
| *G06K 7/10* | (2006.01) | |
| *G06K 19/06* | (2006.01) | |
| *G06K 19/07* | (2006.01) | |
| *G06N 20/00* | (2019.01) | |
| *B60P 3/025* | (2006.01) | |
| *G06K 7/14* | (2006.01) | |
| *G06Q 20/18* | (2012.01) | |
| *G06Q 20/00* | (2012.01) | |
| *G08G 1/04* | (2006.01) | |
| *A23L 5/00* | (2016.01) | |
| *G06Q 50/12* | (2012.01) | |
| *H04W 4/024* | (2018.01) | |
| *H04W 4/40* | (2018.01) | |
| *G07F 17/12* | (2006.01) | |
| *G06Q 30/02* | (2012.01) | |
| *B60H 1/00* | (2006.01) | |
| *B60P 3/00* | (2006.01) | |
| *G01C 21/20* | (2006.01) | |
| *B60R 25/25* | (2013.01) | |
| *H04L 29/08* | (2006.01) | |
| *G06Q 20/12* | (2012.01) | |
| *B60R 19/18* | (2006.01) | |
| *B60R 19/48* | (2006.01) | |
| *B60R 21/36* | (2011.01) | |
| *G05D 1/12* | (2006.01) | |
| *A23L 7/109* | (2016.01) | |
| *A23L 2/52* | (2006.01) | |
| *A47J 37/06* | (2006.01) | |
| *H05B 6/68* | (2006.01) | |
| *G06F 16/955* | (2019.01) | |
| *A47J 47/00* | (2006.01) | |
| *G06F 3/0484* | (2013.01) | |
| *H04N 5/76* | (2006.01) | |

(52) U.S. Cl.
CPC ......... *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0631* (2013.01); *G06Q 30/0645* (2013.01); *G06Q 50/12* (2013.01); *G06Q 50/28* (2013.01); *G06Q 50/30* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *H05B 6/688* (2013.01); *A23V 2002/00* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01)

(56) References Cited

U.S. PATENT DOCUMENTS

| | | |
|---|---|---|
| 4,952,911 A | 8/1990 | D'Ambrosia et al. |
| 5,128,861 A | 7/1992 | Kagami et al. |
| 5,179,843 A | 1/1993 | Cohausz et al. |
| 5,207,784 A | 5/1993 | Schwartzendruber et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Glecker et al. |
| 7,281,891 B2 | 10/2007 | Smith et al. |
| 7,521,935 B2 | 4/2009 | Uchida et al. |
| 7,534,984 B2 | 5/2009 | Gleckler |
| 7,676,404 B2 | 3/2010 | Richard et al. |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar et al. |
| 9,256,852 B1 | 2/2016 | Myllymaki |
| 9,307,383 B1 | 4/2016 | Patrick et al. |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald |
| 9,552,564 B1 | 1/2017 | Martenis et al. |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |

(56) References Cited

U.S. PATENT DOCUMENTS

| | | |
|---|---|---|
| 9,898,884 B1 | 2/2018 | Arora et al. |
| 9,905,133 B1 | 2/2018 | Kumar et al. |
| 9,916,557 B1 | 3/2018 | Gillen et al. |
| 9,916,703 B2 | 3/2018 | Douillard et al. |
| 9,984,525 B2 | 5/2018 | Will et al. |
| 10,029,787 B1 | 7/2018 | Lesser et al. |
| 10,120,384 B2 | 11/2018 | Wilkinson et al. |
| 10,198,707 B1 | 2/2019 | Bolton et al. |
| 2002/0023594 A1 | 2/2002 | Greene et al. |
| 2003/0209375 A1 | 11/2003 | Suzuki et al. |
| 2004/0181570 A1* | 9/2004 | Kaneko ............ A47G 29/141 709/200 |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0050082 A1 | 3/2007 | Yoshizaki |
| 2007/0182818 A1 | 8/2007 | Buehler et al. |
| 2007/0235465 A1 | 10/2007 | Walker et al. |
| 2008/0167817 A1 | 7/2008 | Hessler et al. |
| 2010/0036717 A1 | 2/2010 | Trest |
| 2010/0219953 A1 | 9/2010 | Bloy et al. |
| 2010/0228405 A1 | 9/2010 | Morgal et al. |
| 2010/0234991 A1 | 9/2010 | Zini et al. |
| 2010/0301056 A1 | 12/2010 | Wolfe et al. |
| 2011/0130134 A1* | 6/2011 | Van Rysselberghe ............ A47G 29/141 455/422.1 |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0022051 A1 | 1/2014 | Levien et al. |
| 2014/0095350 A1 | 4/2014 | Carr et al. |
| 2014/0136414 A1* | 5/2014 | Abhyanker .......... G06Q 50/28 705/44 |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0350952 A1 | 11/2014 | Utech et al. |
| 2014/0358353 A1 | 12/2014 | Ibanez-Guzman et al. |
| 2014/0380264 A1 | 12/2014 | Misra et al. |
| 2015/0006005 A1 | 1/2015 | Yu et al. |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1 | 6/2015 | Skaaksrud et al. |
| 2015/0170099 A1 | 6/2015 | Beach-Drummond et al. |
| 2015/0170550 A1 | 6/2015 | Jubro et al. |
| 2015/0348112 A1 | 12/2015 | Ramanujam et al. |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1* | 4/2016 | Oz .................... G07C 9/00111 340/5.61 |
| 2016/0247109 A1 | 8/2016 | Scicluna et al. |
| 2016/0286627 A1 | 9/2016 | Chen et al. |
| 2016/0300187 A1* | 10/2016 | Kashi ................ G06Q 10/0836 |
| 2016/0328754 A1 | 11/2016 | Gold et al. |
| 2016/0334797 A1 | 11/2016 | Ross et al. |
| 2016/0357187 A1 | 12/2016 | Ansari |
| 2016/0357188 A1 | 12/2016 | Ansari et al. |
| 2016/0358477 A1 | 12/2016 | Ansari et al. |
| 2016/0363991 A1 | 12/2016 | Schlecht et al. |
| 2017/0011449 A1 | 1/2017 | Mueller et al. |
| 2017/0011580 A1 | 1/2017 | Huang et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124511 A1 | 5/2017 | Mueller et al. |
| 2017/0124547 A1 | 5/2017 | Natarajan et al. |
| 2017/0124781 A1 | 5/2017 | Douillard et al. |
| 2017/0132934 A1 | 5/2017 | Kentley et al. |
| 2017/0132960 A1 | 5/2017 | Kis-Benedek et al. |
| 2017/0153714 A1 | 6/2017 | Gao et al. |
| 2017/0193434 A1 | 7/2017 | Shah et al. |
| 2017/0227962 A1 | 8/2017 | Cesarano et al. |
| 2017/0248964 A1 | 8/2017 | Kentley et al. |
| 2017/0255198 A1 | 9/2017 | Rodriguez et al. |
| 2017/0261977 A1 | 9/2017 | High et al. |
| 2017/0262790 A1 | 9/2017 | Khasis |
| 2017/0282859 A1 | 10/2017 | Grimm et al. |
| 2017/0313421 A1 | 11/2017 | Gil et al. |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1* | 3/2018 | Simms ................ G06Q 10/083 |
| 2018/0082343 A1 | 3/2018 | Gordon et al. |
| 2018/0099602 A1 | 4/2018 | Salter et al. |
| 2018/0101818 A1* | 4/2018 | Simms ............... G06Q 10/0832 |
| 2018/0134200 A1 | 5/2018 | Wilkinson et al. |
| 2018/0144300 A1 | 5/2018 | Wiechers |
| 2018/0157984 A1 | 6/2018 | O'Herlihy et al. |
| 2018/0158018 A1 | 6/2018 | Luckay et al. |
| 2018/0165728 A1 | 6/2018 | McDonald et al. |
| 2018/0189716 A1 | 7/2018 | Crone |
| 2018/0194411 A1 | 7/2018 | Liivik et al. |
| 2018/0196416 A1 | 7/2018 | Iagnemma et al. |
| 2018/0196417 A1 | 7/2018 | Iagnemma et al. |
| 2018/0211541 A1 | 7/2018 | Rakah et al. |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti et al. |
| 2018/0285852 A1 | 10/2018 | Matsui |
| 2018/0325333 A1 | 11/2018 | Murphy et al. |
| 2018/0330313 A1 | 11/2018 | Clarke et al. |
| 2018/0349872 A1 | 12/2018 | Ahmed et al. |
| 2018/0373246 A1 | 12/2018 | Laughlin et al. |
| 2018/0374002 A1 | 12/2018 | Li et al. |
| 2019/0023236 A1 | 1/2019 | Webb et al. |
| 2019/0043001 A1 | 2/2019 | Woulfe et al. |
| 2019/0056751 A1 | 2/2019 | Ferguson et al. |

FOREIGN PATENT DOCUMENTS

| | | |
|---|---|---|
| JP | 2006177843 A | 7/2006 |
| WO | WO-2013025803 A1 | 2/2013 |
| WO | WO-2015160782 A1 | 10/2015 |
| WO | WO-2017014544 A1 | 1/2017 |
| WO | WO-2017064202 A1 | 4/2017 |
| WO | WO-2019018695 A1 | 1/2019 |
| WO | WO-2019023518 A1 | 1/2019 |
| WO | WO-2019023519 A1 | 1/2019 |
| WO | WO-2019023521 A1 | 1/2019 |
| WO | WO-2019023522 A1 | 1/2019 |
| WO | WO-2019023615 A1 | 1/2019 |
| WO | WO-2019023686 A1 | 1/2019 |

OTHER PUBLICATIONS

PCT/US2018/043986 International Search Report and Written Opinion dated Oct. 23, 2018.
PCT/US2018/044155 International Search Report and Written Opinion dated Oct. 15, 2018.
PCT/US2018/044248 International Search Report and Written Opinion dated Oct. 24, 2018.
U.S. Appl. No. 16/048,124 Office Action dated Nov. 1, 2018.
American National Standard for Safe Use of Lasers. ANSI ZI136.1-2000 (§4.5.1.5; 4.5.1.3-4 and p. 5) (19 pgs) (2000).

(56) References Cited

OTHER PUBLICATIONS

AN/TPS-43 Radar System Westinghouse. Westinghouse (pp. 3, 4, 6, 9 & 14) (14 pgs) (2007).
Chen et al. 3d object proposals for accurate object class detection. In Advances in Neural Information Processing Systems, pp. 424-432 (2015).
Chen et al. Monocular 3d object detection for autonomous driving. In Proceedings of the IEEE Conference on Computer Vision and Pattern Recognition, pp. 2147-2156 (2016).
Chen et al. Multi-view 3d object detection network for autonomous driving. In IEEE CVPR, pp. 1907-1915 (2017).
Co-pending U.S. Appl. No. 16/040,418, filed Jul. 19, 2018.
Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/040,446, filed Jul. 19, 2018.
Co-pending U.S. Appl. No. 16/046,954, filed Jul. 26, 2018.
Co-pending U.S. Appl. No. 16/046,967, filed Jul. 26, 2018.
Co-pending U.S. Appl. No. 16/046,980, filed Jul. 26, 2018.
Co-pending U.S. Appl. No. 16/047,901, filed Jul. 27, 2018.
Co-pending U.S. Appl. No. 16/048,124, filed Jul. 27, 2018.
Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).
Engelcke et al. Vote3deep: Fast object detection in 3d point clouds using efficient convolutional neural networks. In Robotics and Automation (ICRA), 2017 IEEE International Conference on, pp. 1355-1361 (2017).
Food and Drugs Rule—Performance Standards for Light-Emitting Products 21 C.F.R. § 1040.10 (19 pgs) (2005).
Fox. vol. 6: Active Electro-Optical Systems. The Infrared & Electro-Optical Systems Handbook. (326 pgs) (1993).
Geiger et al. Vision meets robotics: The KITTI dataset. The International Journal of Robotics Research 32(11):1231-1237 (2013).
Girshick et al. Rich feature hierarchies for accurate object detection and semantic segmentation. In Computer Vision and Pattern Recognition (CVPR) 2014 IEEE Conference on, pp. 580-587 (2014).
Gustavson. Diode-laser radar for low cost weapon guidance. SPIE 1633(VII):21-32 (pp. 21, 27, 28, 31 & Fig. 3.3-1) (1992).
Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).
Kilpela. Precise pulsed time-of-flight laser range finder for industrial distance measurements. Review of Scientific Instruments 72:2197 (Apr. 2001).
Lahoud et al. 2d-driven 3d object detection in rgb-d images. In Proceedings of the IEEE Conference on Computer Vision and Pattern Recognition, pp. 4622-4630 (2017).
Liu et al. SSD: Single shot multibox detector. In European conference on computer vision, pp. 21-37. Springer (2016).
Maturana et al. Voxnet: A 3d convolutional neural network for real-time object recognition. In IEEE/RSJ International Conference on Intelligent Robots and Systems (7 pgs) (Sep. 2015).
Mousavian et al. 3d bounding box estimation using deep learning and geometry. In Computer Vision and Pattern Recognition (CVPR), pp. 7074-7082 (2016).
Qi et al. Pointnet++: Deep hierarchical feature learning on point sets in a metric space. NIPS (14 pgs) (2017).
Qi et al. Frustum PointNets for 3D Object Detection from RGB-D Data. In Computer Vision and Pattern Recognition (CVPR), pp. 918-927 (Apr. 2018).
Qi et al. Pointnet: Deep learning on point sets for 3d classification and segmentation. Proc. Computer Vision and Pattern Recognition (CVPR), pp. 652-660 (2017).
Qi et al. Volumetric and multi-view cnns for object classification on 3d data. In Proceedings Computer Vision and Pattern Recognition (CVPR), pp. 5648-5656 (2016).
Ren et al. Accurate single stage detector using recurrent rolling convolution. In Computer Vision and Pattern Recognition (CVPR), pp. 5420-5428 (2017).
Ren et al. Faster r-cnn: Towards real-time object detection with region proposal networks. In Advances in neural information processing systems, pp. 91-99 (2015).
Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision-ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).
Su et al. Multi-view convolutional neural networks for 3d shape recognition. In Proceedings of the IEEE Conference on Computer Vision and Pattern Recognition, pp. 945-953 (2015).
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Rescue Robotics (SSRR) INSPEC Accession No. 17315970 (2017).
Qi et al. Frustum PointNets for 3D Object Detection from RGB-D Data. Available from https://arxiv.org/pdf/1711.08488v1.pdf (15 pgs.) (Nov. 2017).
PCT/US2018/042967 International Search Report and Written Opinion dated Sep. 26, 2018.
PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
U.S. Appl. No. 16/040,446 Office Action dated Oct. 17, 2018.
Curtis et al., Skype founders invent self-driving robot that can deliver groceries for L1. London Telegraph (3 pgs) (2015).
Emerging Tech. Domino's has built a self-driving pizza delivery robot. Available at https://www.digitaltrends.com/cool-tech/dominos-pizza-delivery-robot/ (12 pgs) (2016).
Navarro et al. A mobile robot vending machine for beaches based on customers preferences and multivariate methods. Procedia—Social and Behavioral Sciences 175:122-129 (2015).
Olson . Self-Driving Robots Will Start Delivering Food for Just Eat and Others. Available at https://www.forbes.com/sites/parmyolson/2016/07/05/self-driving-robots-food-delivery-just-eat/#6e3e834b280d (3 pgs) (2016).
Peters. The Grocery Store, of the Future is Mobile, Self-Driving and Run by AI. Fast Company (6 pgs.) (Jun. 13, 2017).

(56) References Cited

OTHER PUBLICATIONS

Pettitt. Forget delivery drones, meet your new delivery robot. Available at https://www.cnbc.com/2015/11/02/forget-delivery-drones-meet-your-new-delivery-robot.html (5 pgs) (2015).
Ratkov. Robotic Vending Machines Anthonyratkkov.com/robotics/robotic vending machines (2 pgs.) (2010).
U.S. Appl. No. 16/046,954 Office Action dated Jun. 6, 2019.
U.S. Appl. No. 16/046,954 Office Action dated Nov. 29, 2018.
U.S. Appl. No. 16/046,967 Office Action dated Dec. 4, 2018.
U.S. Appl. No. 16/046,967 Office Action dated Mar. 28, 2019.
U.S. Appl. No. 16/046,980 Office Action dated Feb. 27, 2019.
U.S. Appl. No. 16/046,980 Office Action dated Jun. 6, 2019.
U.S. Appl. No. 16/047,901 Office Action dated Dec. 11, 2018.
U.S. Appl. No. 16/047,901 Office Action dated Mar. 28, 2019.
Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).

\* cited by examiner

SYSTEM AND MECHANISM FOR UPSELLING PRODUCTS ON AUTONOMOUS VEHICLES

CROSS REFERENCE

This application claims priority to U.S. Provisional Application No. 62/538,538, filed on Jul. 28, 2017, the contents of which are incorporated herein by reference in its entirety.

BACKGROUND OF THE INVENTION

The field of autonomous and semi-autonomous vehicles is a growing field of innovation. Vehicles are being used for many purposes including warehouse inventory operations, household operations, hospital deliveries, sanitation, and military or defense applications.

SUMMARY OF THE INVENTION

This disclosure relates to an autonomous and/or semi-autonomous vehicle fleet comprising a plurality of vehicles, in particular vehicles for transporting or retrieving deliveries in either unstructured outdoor environment or closed environments.

One aspect provided herein is a platform for autonomously or semi-autonomously delivering a second item to a customer, the platform comprising: an autonomous or semi-autonomous vehicle comprising: a locking compartment configured to contain and secure at least one of a first item and at least one of a second item, wherein the locking compartment comprises a sensor configured to detect an absence of at least one of the first item and the second item; an input device configured to receive at least one of a customer verification and a selection of the second item by the customer; and an autonomous or semi-autonomous propulsion; and the platform further comprising a non-transitory computer-readable storage media encoded with a computer program including instructions executable by a processor to create an application comprising: an ordering module configured to receive an order from the customer, the order comprising the first item and a customer location; a delivery module controlling the autonomous or semi-autonomous propulsion system to direct the autonomous or semi-autonomous vehicle to the customer location; and a customer verification module confirming an identity of the customer based on the customer verification and unlocking the locking compartment based on the confirmation of the identity of the customer; and a release detection module determining that first item has been removed from the compartment based on the absence of the first item, determining that second item has been removed from the compartment based on the absence of the second item, or both.

In some embodiments, the sensor comprises at least one of a thermometer, a barcode scanner, an RFID reader, a scale, a pressure sensor, a switch, and a camera. In some embodiments, the input device comprises Wi-Fi input device, a Bluetooth input device, a cellular input device, a button, a touchscreen, a camera, a USB input, a keyboard, or any combination thereof. In some embodiments, the application further comprises a database module. In some embodiments, the database comprises a customer data associated with the customer, and wherein the application further comprises a prediction module configured to determine the second item based at least on the first item and the customer data. In some embodiments, the prediction module determines the second item by a machine learning algorithm. In some embodiments, the prediction module is further configured to send a loading instruction to a loading administrator based on the determination of the second item. In some embodiments, the database module comprises a plurality of unique identifiers comprising at least a first identification and a second identification, wherein the first identification is associated with the first item, and wherein the second identification is associated with the second item. In some embodiments, the first item comprises a first indicator associated with the first identification, the second item comprises a second indicator associated with the second identification, or both. In some embodiments, the release detection module detects that first item has been removed by detecting the first indicator and release detection module detects that second item has been removed by detecting the second indicator. In some embodiments, the locking compartment is configured to contain and secure 2 or more first items, 2 or more second items, or both. In some embodiments, the locking compartment further comprises a vending mechanism configured to vend at least one of the first item and the second item. In some embodiments the platform further comprises a communication device configured to receive an instruction from a fleet management module. In some embodiments, the instruction comprises at least one of the customer location, and the customer verification. In some embodiments the platform further comprises at least one of an energy storage device, and an energy collection device. In some embodiments the platform further comprises a screen configured to display a media. In some embodiments, the media comprises a media based on the first item, a media associated with the second item, a price associated with the first item, a price associated with the second item, the selection, the order, the absence of the first item, the absence of the second item, the customer location, the customer verification, or any combination thereof. In some embodiments, the application further comprises a payment module configured to charge the customer based on the first item being removed from the compartment, that second item being removed from the compartment, or both. In some embodiments, at least a portion of the application is performed aboard the vehicle. In some embodiments, the processor resides aboard the vehicle. In some embodiments, the first item comprises a plurality of first items, the second item comprises a plurality of second items, or both.

Another aspect provided herein is an autonomous or semi-autonomous vehicle for delivering a second item to a customer, the autonomous or semi-autonomous vehicle comprising: a first compartment configured to contain, secure, and vend a first item; a second compartment configured to contain, secure, and vend the second item, wherein the second compartment comprises a sensor configured to detect a presence of the second item; an input device configured to receive a selection of the second item by a customer; an autonomous or semi-autonomous propulsion system; and a non-transitory computer-readable storage media encoded with a computer program including instructions executable by a processor to create an application comprising: an ordering module configured to receive an order for the first item from a customer; a prediction module configured to determine the second item based at least on the first item and a customer data associated with the customer, wherein the prediction module is further configured to send a loading instruction based on the second item; a delivery module controlling the autonomous or semi-autonomous propulsion system to direct the autonomous or semi-autonomous vehicle to a location of the customer; a first vending module directing the first compartment to vend the first item;

a second vending module directing the second compartment to vend the second item based on the selection; and a confirmation module determining that the second item has been vended based at least on the detection of the presence of the second item.

In some embodiments the input device comprises a button, a touchscreen, a Bluetooth sensor, a wireless network device, a cellular network device, a camera, a USB input, a keyboard, or any combination thereof. In some embodiments the first compartment is configured to contain, secure, and vend 2 or more first items. In some embodiments the second compartment is configured to contain, secure, and vend 2 or more second items. In some embodiments at least the first item and the second item is associated with a unique identifier. In some embodiments, the sensor is configured to detect the presence of the second item based on the unique identifier. In some embodiments the sensor comprises at least one of a thermometer, a barcode scanner, an RFID reader, a scale, a pressure sensor, a switch, and a camera. In some embodiments vending the first item comprises unlocking a door of the first compartment, opening a door of the first compartment, releasing the first item from the first compartment, or any combination thereof. In some embodiments vending the second item comprises unlocking a door of the second compartment, opening a door of the second compartment, releasing the second item from the second compartment, or any combination thereof. In some embodiments, the autonomous or semi-autonomous vehicle further comprises a communication device configured to receive an instruction from a fleet management module. In some embodiments the instruction comprises at least one of the first item, the second item, the location of the customer, and an identity of the customer. In some embodiments, the autonomous or semi-autonomous vehicle further comprises at least one of an energy storage device, and an energy collection device. In some embodiments, the autonomous or semi-autonomous vehicle further comprises a screen configured to display a media. In some embodiments the media comprises a media associated with the first item, a media associated with the second item, a price associated with the first item, a price associated with the second item, the selection, the order, the presence of the second item, the location of the customer, an identity of the customer, or any combination thereof. In some embodiments the prediction module is configured to determine the second item based at least on the first item and the customer data associated with the customer by a machine learning algorithm. In some embodiments the application further comprises a payment module configured to charge the customer based on the vending of the first item, the presence of the second item, or both. In some embodiments the first compartment comprises a sensor configured to detect a presence of the first item.

Another aspect provided herein is a vehicle fleet comprising a plurality of autonomous or semi-autonomous vehicles operating autonomously and/or semi-autonomously and a fleet management module, associated with a central server for coordination of the autonomous or semi-autonomous vehicle fleet; the fleet management module configured to coordinate the activity and positioning of each autonomous or semi-autonomous vehicle in the fleet, wherein the fleet is configured for transporting, delivering or retrieving goods or services and capable of operating in an unstructured open or closed environments; each autonomous or semi-autonomous vehicle in the fleet comprising: a power system, a conveyance system; (e.g., a drive system with a propulsion engine, wheels, treads, wings, rotors, blowers, rockets, propellers, brakes, etc.); a navigation module for navigation in the unstructured open or closed environments; (e.g., digital maps, HD maps, GPS); a communication module configurable to receive, store and send data to the fleet management module, a user, and the autonomous or semi-autonomous vehicles in the fleet, related to at least; user interactions and the autonomous or semi-autonomous vehicle fleet interactions, comprising: scheduled requests or orders, on-demand requests or orders, or a need for self-positioning of the autonomous or semi-autonomous vehicle fleet based on anticipated demand within the unstructured open or closed environments; a sensor system, at least one securable compartment or a plurality of securable compartments to hold said goods or items associated with said services; and a controller configurable to associate each one of the at least one or plurality of securable compartments to an assignable customer, or customer group in a marketplace, or provider and provide entry when authorized; at least one processor configured to manage the conveyance system, the navigation module, the sensor system, instructions from the fleet management module, the communication module, and the controller.

In some embodiments, the unstructured open environment is a non-confined geographic region accessible by navigable pathways comprising: public roads; private roads; bike paths; open fields; open public lands; open private lands; pedestrian walkways; lakes; rivers; streams; or open airspace.

In some embodiments, the closed environment is a confined, enclosed or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the navigation module controls routing of the conveyance system of the autonomous or semi-autonomous vehicles in the fleet in the unstructured open or closed environments.

In some embodiments, the communication to the user, to the autonomous or semi-autonomous vehicles in the fleet, between the autonomous or semi-autonomous vehicles of the fleet, and between the user and the autonomous or semi-autonomous vehicles in the fleet, occurs via wireless transmission.

In some embodiments, the user comprises a fleet manager; a sub-contracting vendor; a service provider; a customer; a business entity; an individual; or a third party.

In some embodiments, the user's wireless transmission interactions and the autonomous or semi-autonomous vehicle fleet wireless transmission interactions occur via mobile application transmitted by an electronic device and forwarded to the communication module via: a central server; a fleet management module; and/or a mesh network.

In some embodiments, the electronic device comprises: a phone; a personal mobile device; a personal digital assistant (PDA); a mainframe computer; a desktop computer; a laptop computer; a tablet computer; and/or wearable computing device comprising: a communication headset; smart glasses; a contact lens or lenses; a digital watch; a bracelet; a ring; jewelry; or a combination thereof.

In some embodiments, each autonomous or semi-autonomous vehicle fleet is configured with a maximum speed range from 1.0 mph to 90.0 mph.

In some embodiments, the plurality of securable compartments are humidity and temperature controlled for: hot goods, cold goods, wet goods, dry goods, or combinations or variants thereof.

In some embodiments, the plurality of securable compartments are configurable for a plurality of goods. Such configurations and goods comprise: bookshelves for books; thin drawers for documents; larger box-like drawers for packages, and sized compartments for vending machines, coffee makers, pizza ovens and dispensers.

In some embodiments, the plurality of securable compartments are variably configurable based on: anticipated demands; patterns of behaviors; area of service; or types of goods to be transported.

In some embodiments, the services comprise: subscription services; prescription services; marketing services; advertising services; notification services; a mobile marketplace; or requested, ordered or scheduled delivery services. In particular embodiments, the scheduled delivery services include, by way of example, special repeat deliveries such as groceries, prescriptions, drinks, mail, documents, etc.

In some embodiments, the services further comprise: the user receiving and returning the same or similar goods within the same interaction; (e.g., signed documents); the user receiving one set of goods and returning a different set of goods within the same interaction; (e.g., product replacement/returns, groceries, merchandise, books, recording, videos, movies, payment transactions, etc.); a third party user providing instruction and or authorization to a goods or service provider to prepare, transport, deliver and/or retrieve goods to a principle user in a different location.

In some embodiments, the services further comprise: general services, (e.g., picking up a user's dry cleaning, dropping off a user's dry cleaning, renting goods, (such as tools, DVDs, etc.), sharing/borrowing goods from other users or businesses, etc.). Further still, it may be a general pickup service for items to be shipped, returned, or sent to other users/businesses, etc.

In some embodiments, at least one autonomous or semi-autonomous vehicle in the fleet is further configured to process or manufacture goods.

In some embodiments, the processed or manufactured goods comprise: beverages, etc., with or without condiments; (e.g., coffee, tea, carbonated drinks, etc.); a plurality of fast foods; or microwavable foods.

In some embodiments, the autonomous or semi-autonomous vehicle fleet further comprises at least one autonomous or semi-autonomous vehicle having a digital display for curated content comprising: advertisements (i.e., for both specific user and general public), including; services provided, marketing/promotion, regional/location of areas served, customer details, local environment, lost, sought or detected people, public service announcements, date, time, or weather.

In some embodiments of the autonomous or semi-autonomous vehicle fleet, the positioning of autonomous or semi-autonomous vehicles can be customized based on: anticipated use, a pattern of historical behaviors, or specific goods being carried.

In some embodiments, the autonomous or semi-autonomous vehicle fleet is fully-autonomous.

In some embodiments, the autonomous or semi-autonomous vehicle fleet is semi-autonomous.

In some embodiments, the autonomous or semi-autonomous vehicle fleet is controlled directly by the user.

In some embodiments of the autonomous or semi-autonomous vehicle fleet, a plurality of said autonomous or semi-autonomous vehicles within the fleet is operated on behalf of third party vendor/service provider; (e.g., fleet managed by an owner, but providing a coffee service/experience for a third party vendor (i.e., Starbucks) with white label vehicles in the fleet).

In some embodiments of the autonomous or semi-autonomous vehicle fleet, a plurality of said autonomous or semi-autonomous vehicles within the fleet is further configured to be part of a sub-fleet comprising a sub-plurality of autonomous or semi-autonomous vehicles, wherein each sub-fleet is configured to operate independently or in tandem with multiple sub-fleets comprising two or more sub-fleets.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

This disclosure relates to an autonomous and/or semi-autonomous vehicle fleet comprising a plurality of autonomous or semi-autonomous vehicles, for transporting or retrieving deliveries in either open unstructured outdoor environments or closed environments.

Many marketplaces and vendors encourage purchases of additional products, such as, for example, by placing candies near the checkout counter of a grocery store. Although such additional products are carefully selected and positioned to attract attention from the average customer, such techniques cannot be optimized to upsell items based on the particular customer or their intended purchase.

While additional purchase encouragement can also be performed by manual or autonomous product delivery, no current systems, methods, or devices are configured to maintain a pertinent and easily customizable mobile stock. Further, such systems and platforms are not configured for real-time order amendments or returns. Finally, as cargo space is limited in most autonomous or semi-autonomous vehicles, for energy consumption, and as such systems do not employ human teller, triage and prioritization of any upsell stock is uniquely pertinent.

As such, provided herein is an autonomous or semi-autonomous vehicle for delivering a second item to a customer, the autonomous or semi-autonomous vehicle comprising: a first compartment configured to contain, secure, and vend a first item; a second compartment configured to contain, secure, and vend the second item, wherein the second compartment comprises a sensor configured to detect a presence of the second item; an input device configured to receive a selection of the second item by a customer. In some embodiments, the autonomous or semi-autonomous vehicle is configured to maintain a pertinent and easily customizable mobile stock. The autonomous or semi-autonomous vehicle may be configured for real-time order amendments or returns and prioritize and predict additional sale items that are uniquely pertinent.

Fleet of Autonomous or Semi-Autonomous Vehicles

Figure 1:
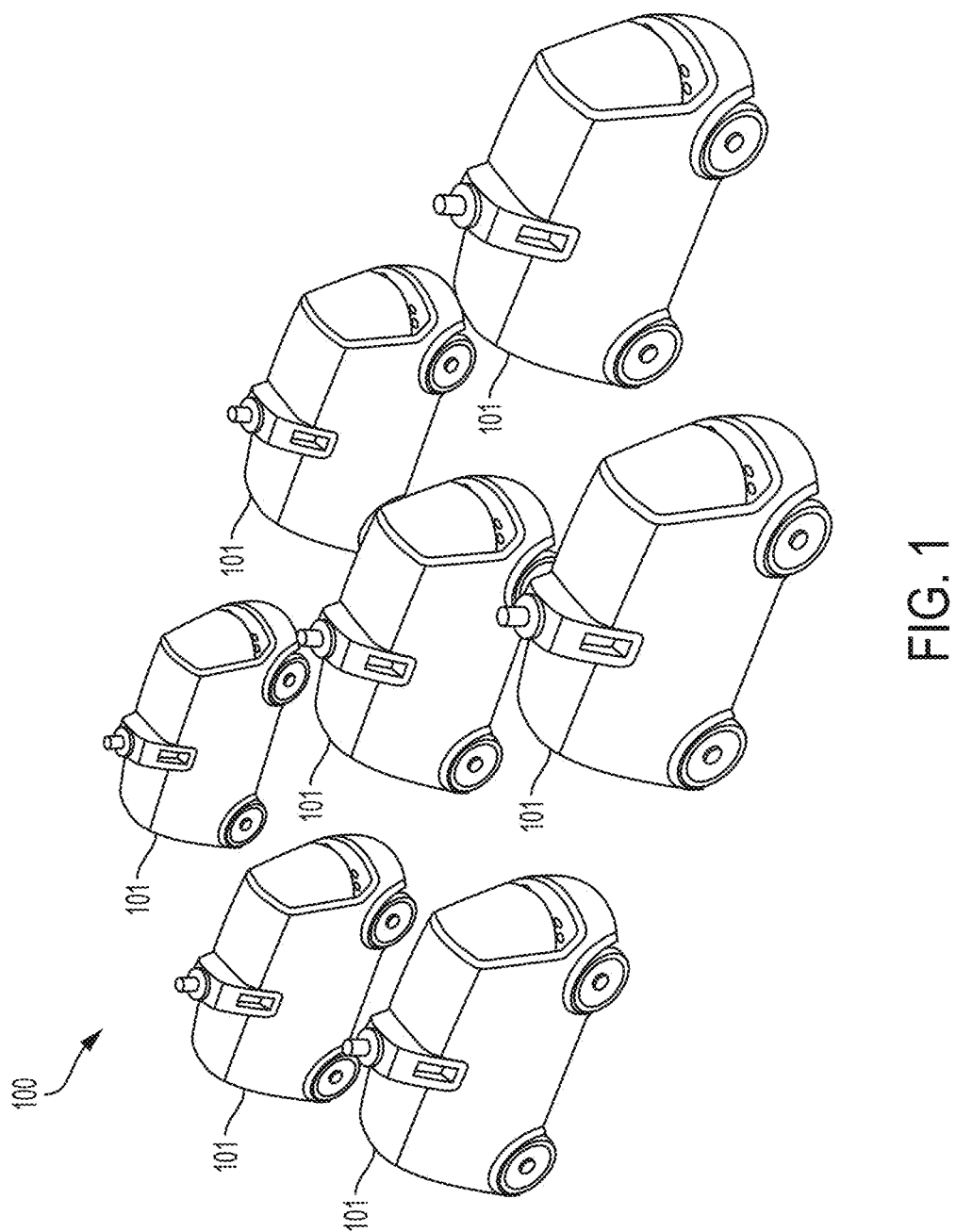
FIG. 1 is an illustration of an exemplary autonomous or semi-autonomous vehicle fleet, in accordance with some embodiments.
Figure 2:
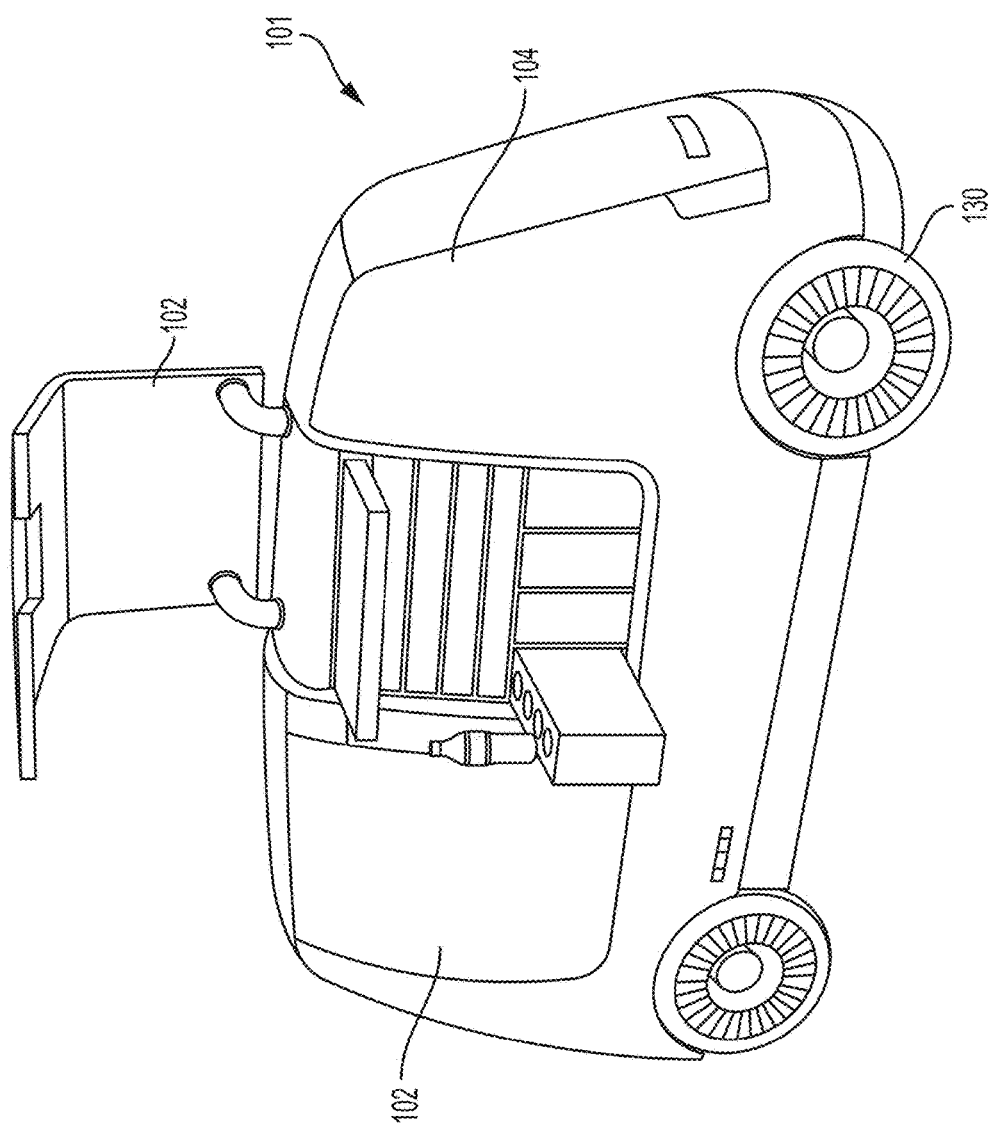
FIG. 2 is an perspective view of an exemplary autonomous or semi-autonomous vehicle comprising a plurality of compartments, in accordance with some embodiments.
Figure 3:
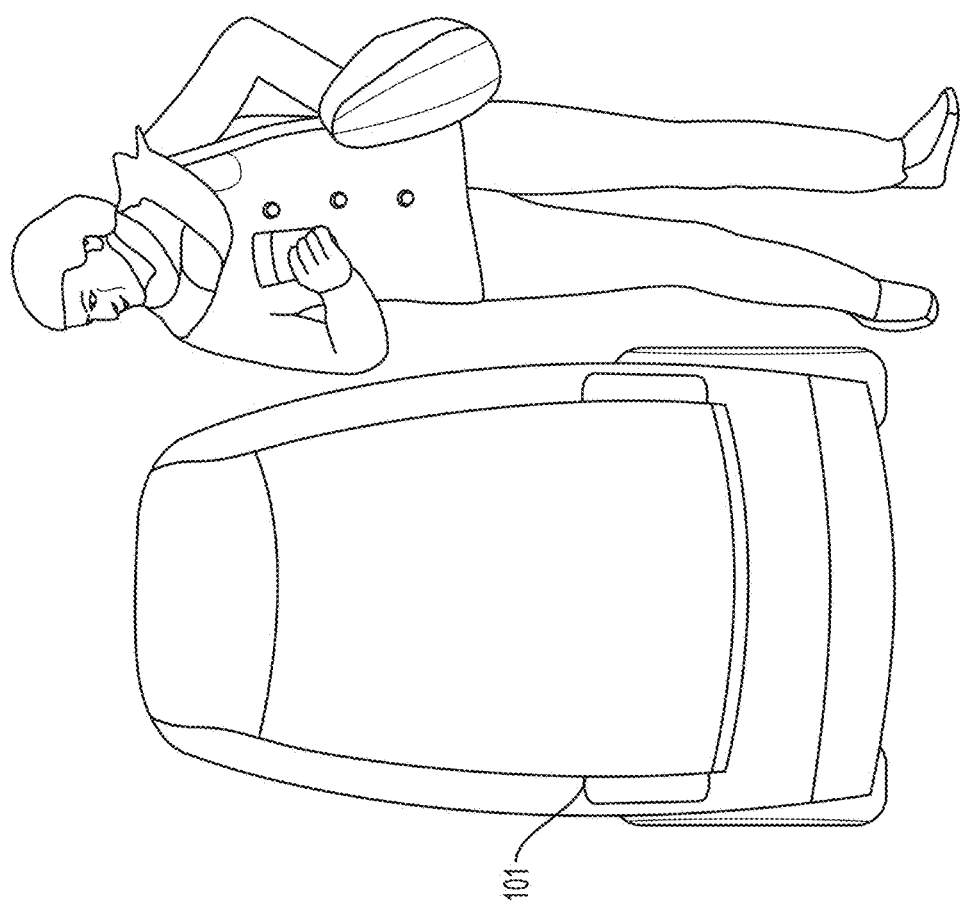
FIG. 3 is an front view of an exemplary autonomous or semi-autonomous vehicle beside a walking person, in accordance with some embodiments.
Figure 4:
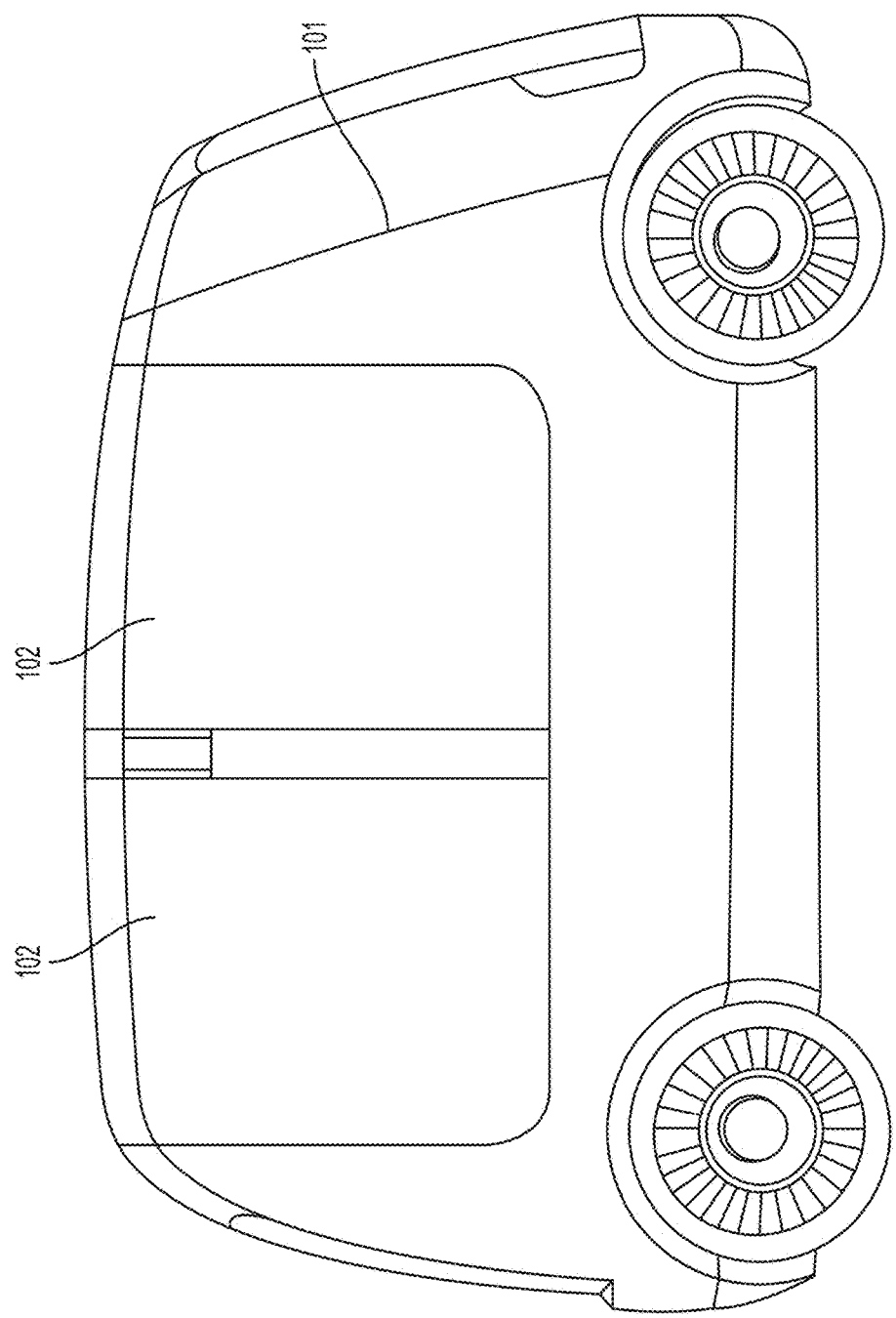
FIG. 4 is an right side view of an exemplary autonomous or semi-autonomous vehicle, in accordance with some embodiments.
Figure 5:
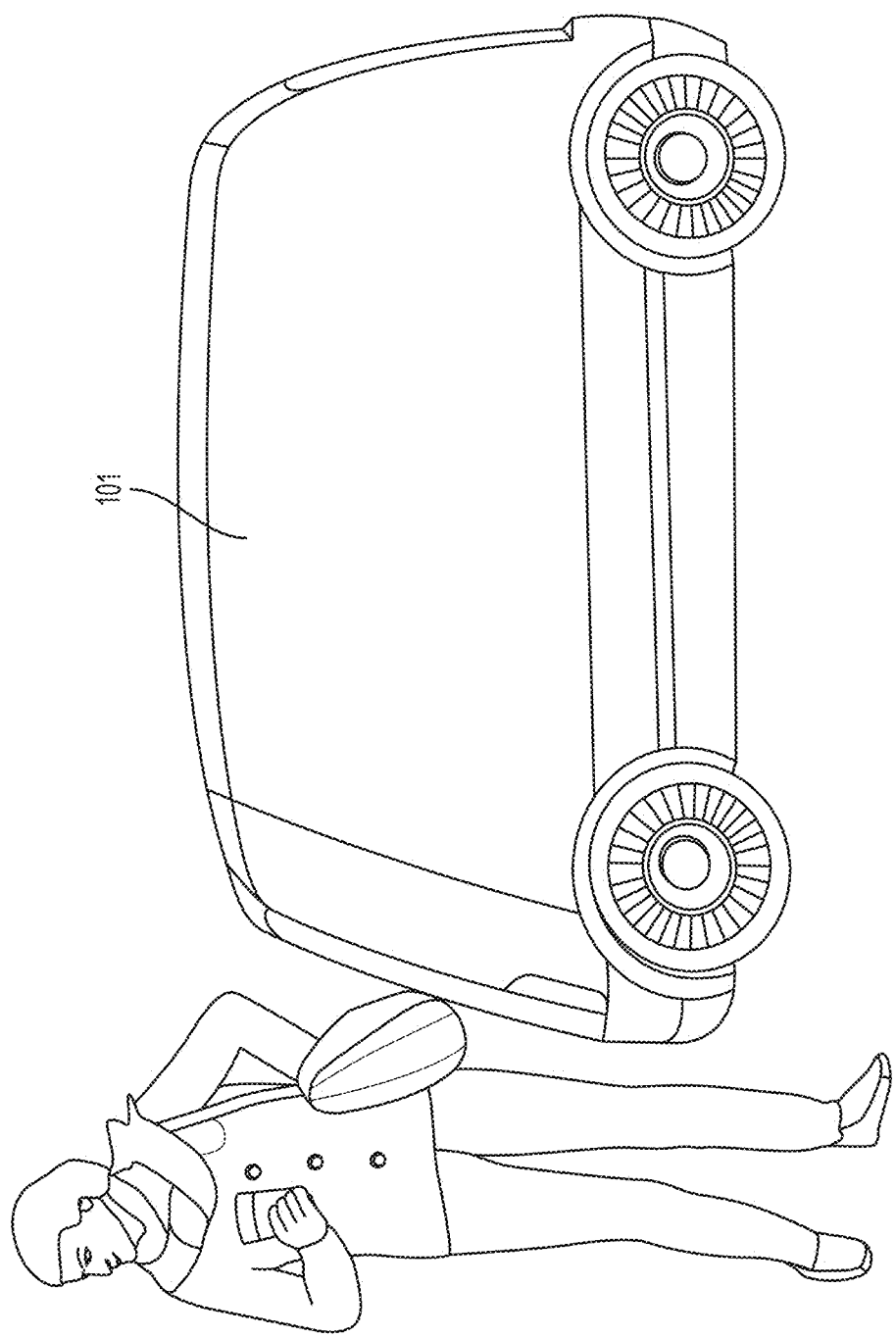
FIG. 5 is an left side view of an exemplary autonomous or semi-autonomous vehicle beside an average person, in accordance with some embodiments.
Figure 6:
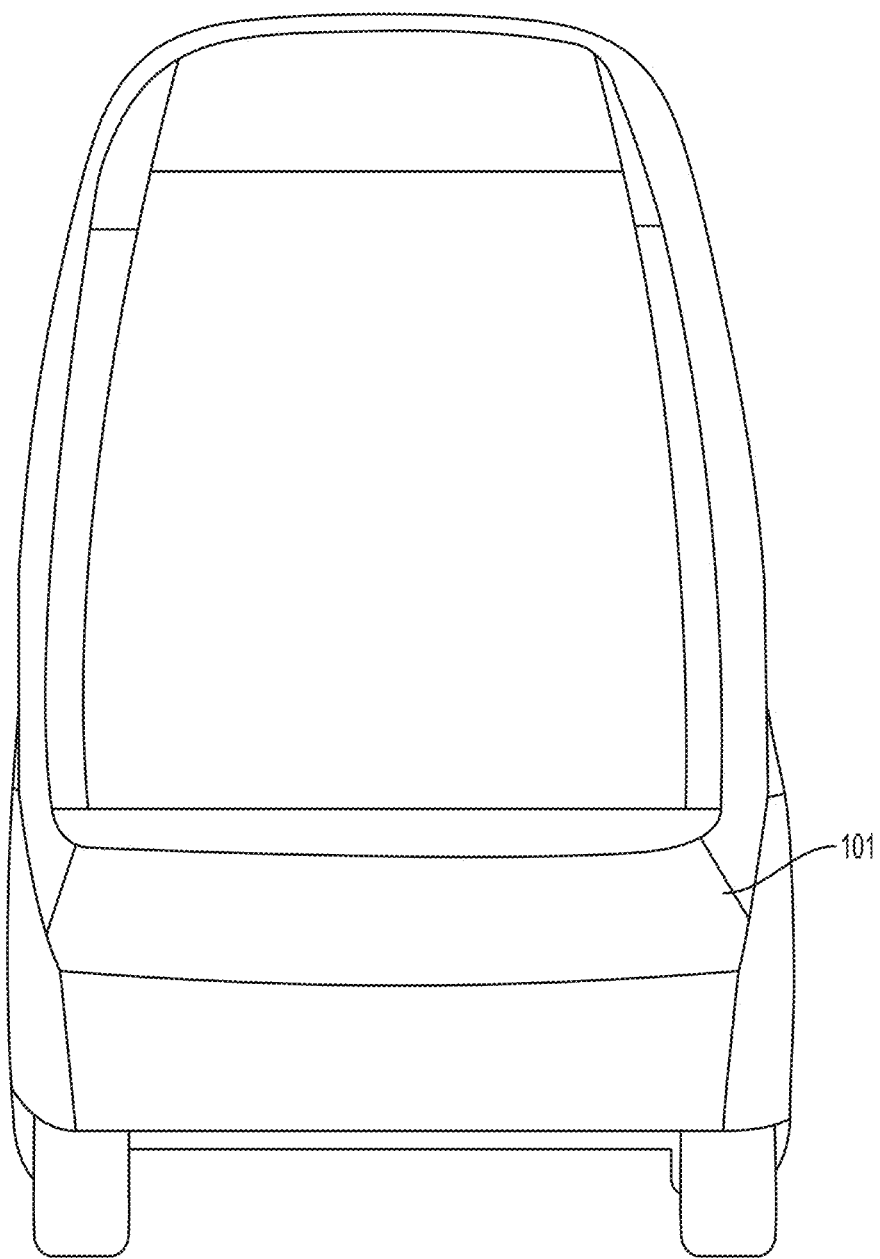
FIG. 6 is an rear view of an exemplary autonomous or semi-autonomous vehicle in accordance with some embodiments.
Figure 7:
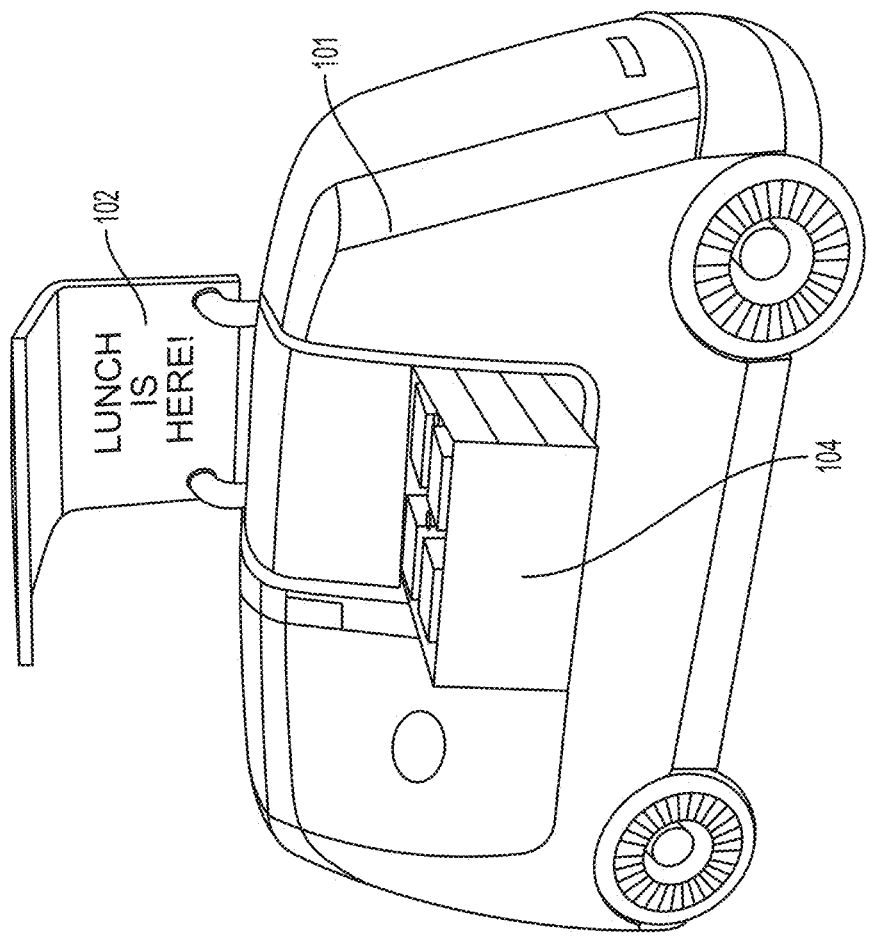
FIG. 7 is a perspective view of an exemplary food delivery autonomous or semi-autonomous vehicle, in accordance with some embodiments.

Provided herein, per FIG. 1, is an autonomous or semi-autonomous vehicle fleet 100, comprising a plurality of autonomous or semi-autonomous vehicles 101, each one operating autonomously or semi-autonomously.

In some embodiments, the fleet 100 of vehicles is fully-autonomous. In some embodiments, the fleet 100 of vehicles is semi-autonomous. In some embodiments, at least one of a fleet operator 200, a provider 204, and a customer 202 can override and manually control the autonomous or semi-autonomous vehicle 101. Manual override may be required to address navigation malfunctions, provider inventory issues, or unanticipated traffic, mechanical failure, electrical failure, traffic accident, and road conditions. In some embodiments, manual control comprises direct control of the autonomous or semi-autonomous vehicle's 101 processor to override the conveyance and sensor systems. In other cases, manual control comprises a fleet operator manually returning the vehicle to a base station for repair.

In some embodiments, the autonomous or semi-autonomous vehicle fleet 100 is controlled directly by a user 200. In some embodiments of the plurality of autonomous or semi-autonomous vehicles 101 within the fleet 100 is operated on behalf of third party vendor or service provider. The third party vendor or service provider may comprise a food and beverage provider.

In some embodiments of the autonomous or semi-autonomous vehicle fleet, a plurality of said autonomous or semi-autonomous vehicles within the fleet is further configured to be part of a sub-fleet comprising a sub-plurality of autonomous or semi-autonomous vehicles, each sub-fleet is configured to operate independently or in tandem with multiple sub-fleets comprising two or more sub-fleets (100-a, 100-b). In the case wherein the third party vendor or service provider comprises a food and beverage provider, a sub-fleet of "white label" vehicles may display the logo and vend the products of the third party food and beverage provider.

In the case where the third party vendor or service provider comprises a package delivery service, multiple sub-fleets can be employed, each of which provide a specific service to its customer. Levels of service in this case may include immediate dedicated rush service, guaranteed morning/afternoon delivery service, and general delivery service. Alternatively, a third party may have priority over a certain number of autonomous or semi-autonomous vehicles 101 in the fleet 100, which are otherwise tasked with alternative assignments (e.g., other third parties) to guarantee a certain level of responsiveness.

Fleet Management Module

In some embodiments of the autonomous or semi-autonomous vehicle fleet 100, the fleet comprises a fleet management module 120 for coordination of the autonomous or semi-autonomous vehicles 101 in the fleet 100 and communication with fleet owners, fleet operators, users, service providers, vendors, businesses and customers to optimize assignment and coordination. The fleet management module may work in coordination with a central server 110. The central server 110 may be located in a central operating facility owned or managed by the fleet owner 200.

In some embodiments, the fleet management module 120 may direct each of the autonomous or semi-autonomous vehicles 101 through a navigation module 140. The navigation module 140 may employ maps generated by the user, an operator, the public or a fleet operator, comprising digital maps, HD maps, weather conditions, elevation maps, GPS coordinates, or any combination thereof to operate within structured, open unstructured, or closed environments. The a navigation module 140 may further employ a sensor on board the autonomous or semi-autonomous vehicles 101, such as a camera, a LiDAR, an altimeters, a microphone, a GPS sensor, or a radar, to confirm its augment or confirm the navigational instructions, driving conditions, and uncharted obstacles. As such, the navigation module 140, in combination with processors and/or applications aboard the autonomous or semi-autonomous vehicles 101 enable a safe, robust navigation trajectory.

In some embodiments, the autonomous fleet 100 is strategically positioned throughout a geographic region in anticipation of a known demand. Over time, a user 200 and/or a vendor 204 can anticipate demand for autonomous or semi-autonomous vehicle services by storing data relating to the quantity, timing, and type of orders received in each region. Such demand prediction can be performed for both source location (e.g., restaurants, grocery stores, general businesses, etc.) and delivery location (e.g., customer, other businesses, etc.). Such demand predictions can further be weighted by the cost or importance of the good or service and employ historical trends for higher efficiency and throughput. As such, the fleet management module 120 may position the autonomous or semi-autonomous vehicles 101 as close as possible to the expected source locations.

Figure 12:
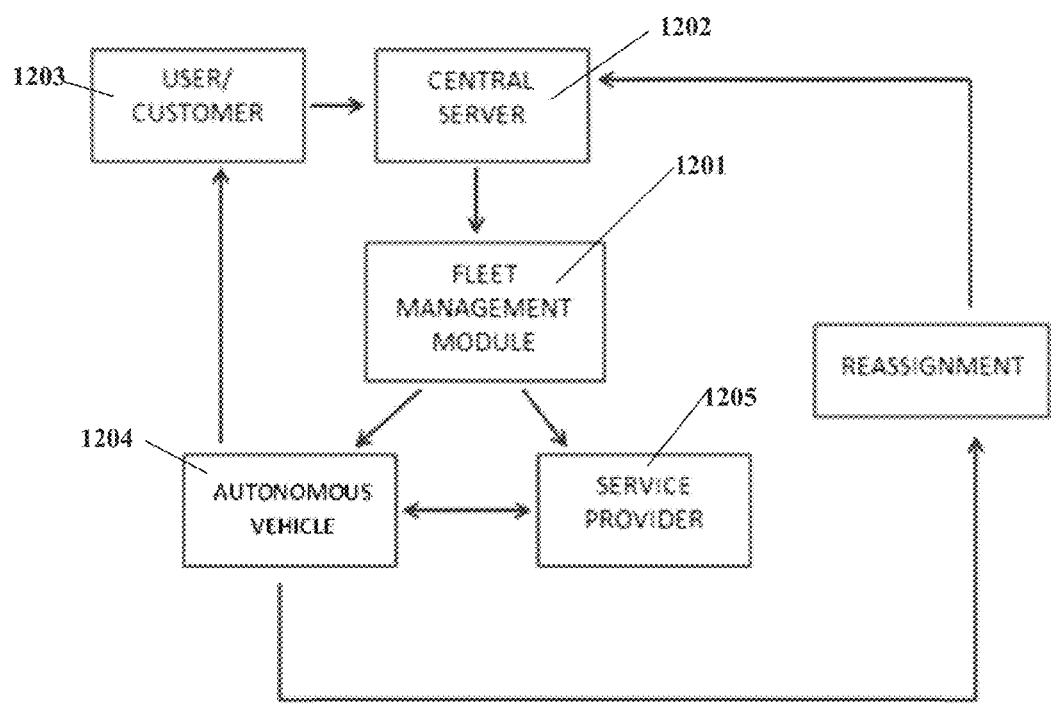
FIG. 12 is an exemplary flowchart representation of the logic for a fleet management control module associated with a central server for the autonomous or semi-autonomous vehicle fleet, in accordance with some embodiments.

As illustrated in FIG. 12, in one embodiment, a request is sent to a main server 110, which then communicates with the fleet management module 120 to relay the request to a service provider 204 (e.g., restaurant, delivery service, vendor, or retailer) and an one or more autonomous or semi-autonomous vehicles 101 in the fleet 100. The fleet management module 120 may select the autonomous or semi-autonomous vehicles 101 in the fleet 100 within the geographic region and/or proximity service provider. The assigned autonomous or semi-autonomous vehicle 101 then arrives at a location associated with the service provider 204 to receive the good. The autonomous or semi-autonomous vehicle 101 then travels to the customer 202, whereby the customer interacts with the autonomous or semi-autonomous vehicle 101 to retrieve their goods or service (e.g., an ordered good) by, for example, requesting that the autonomous or semi-autonomous vehicle 101 open its compartment 102, 104. The autonomous or semi-autonomous vehicle 101 may receive the request through a customer application, or a user interface on the autonomous or semi-autonomous vehicle 101 itself, comprising, for example, an RFID reader, a touchpad, a keypad, a voice command, or a vision-based recognition. Upon completion of the delivery (or retrieval, if appropriate), the autonomous or semi-autonomous vehicle 101 reports completion of the assignment and waits, or returns to a start location, for re-assignment.

Figure 13:
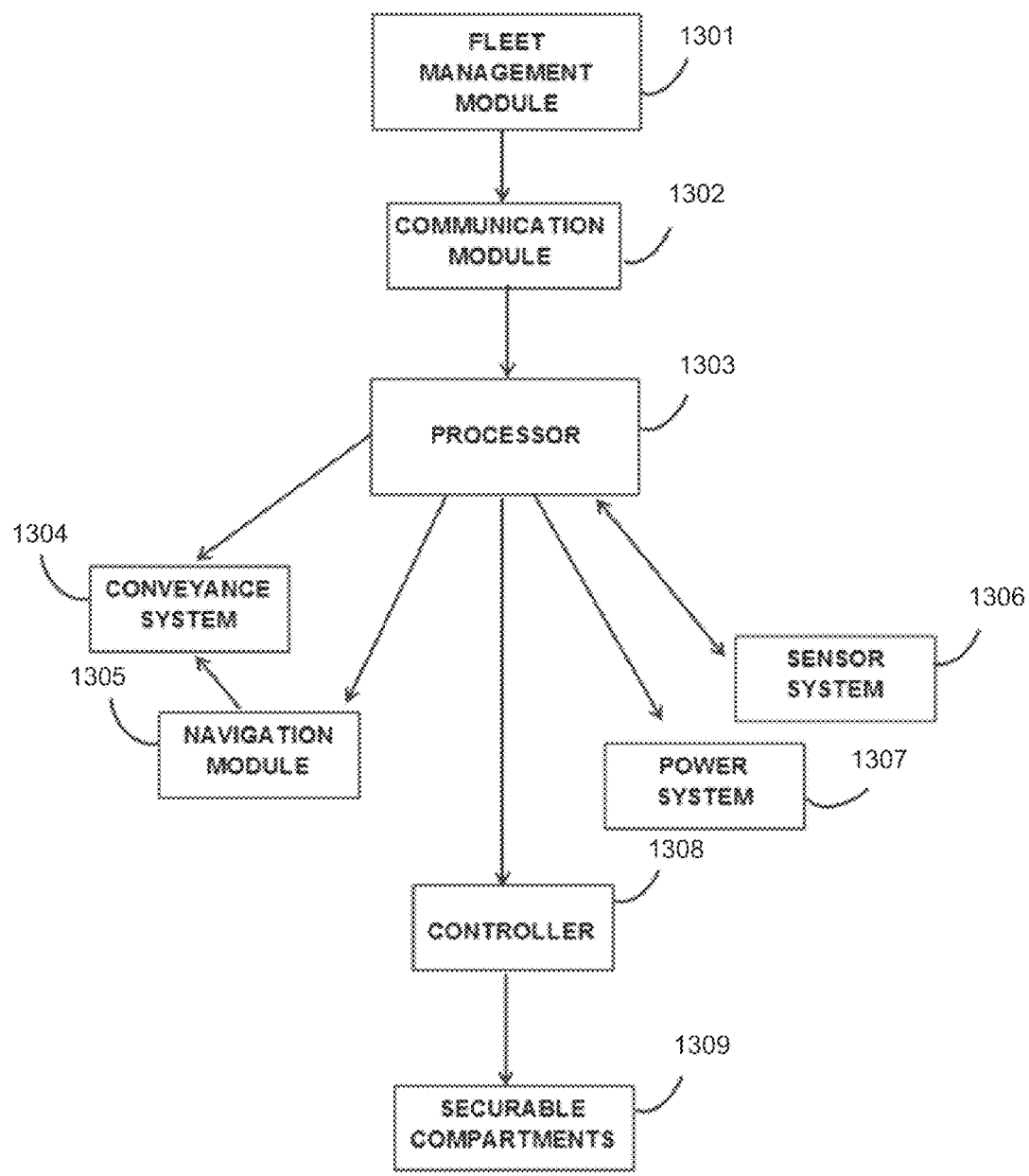
FIG. 13 is an exemplary flowchart representation of the logic flow from the Fleet Management Control Module through the autonomous or semi-autonomous vehicle processor to the various systems and modules of the autonomous or semi-autonomous vehicle, in accordance with some embodiments.

In some embodiments, per FIG. 13, the fleet management module 120 coordinates the autonomous or semi-autonomous vehicle fleet 100 by utilizing the autonomous or semi-autonomous vehicle's processor 125 to process data from each of the autonomous or semi-autonomous vehicle's systems and modules such as the conveyance system 130, the power system 135, the navigation module 140, the sensor system 170, 175, the communication module 160, and the controller 150.

In another example, the provided service comprises retrieval of an item from a first party and delivery of the item to a second party. In this scenario, the fleet management module 120 may assign the autonomous or semi-autonomous vehicle 101 to arrive at a given location associated with the first party, assign a securable compartment within the autonomous or semi-autonomous vehicle 101 for receipt of the item, confirm receipt of the item from the first party, navigate to a location associated with the second party, deliver the item to the second party upon, and receive delivery confirmation from the second party. In some embodiments, delivery of the item to the second party comprises the second party entering a PIN or other recognition code to gain access to the secure compartment.

Autonomous Vehicles

As illustrated in FIGS. 3-11B, an exemplary autonomous or semi-autonomous vehicle 101 may comprise an autonomous or semi-autonomous vehicle configured for land travel. The autonomous or semi-autonomous vehicle 101 may have a width, a height, and a length, wherein the length is about 2 feet to about 5 feet. The autonomous or semi-autonomous vehicle 101 may be lightweight and have a low center of gravity for increased stability. The autonomous or semi-autonomous vehicle 101 may be configurable for land, water, or air. The autonomous or semi-autonomous vehicle 101 may comprise a land vehicle such as, for example, a car, a wagon, a van, a tricycle, a truck, a trailer, a bus, a train, or a tram. The autonomous or semi-autonomous vehicle 101 may comprise a watercraft such as, for example, a ship, a boat, a ferry, a landing craft, a barge, a rafts, or a hovercraft. Alternatively, the autonomous or semi-autonomous vehicle 101 may comprise an aircraft or a spacecraft.

Each autonomous or semi-autonomous vehicle 101 in the fleet may comprise an autonomous or semi-autonomous propulsion system 130 comprising a drive system, a propulsion engine, a wheel, a treads, a wing, a rotor, a blower, a rocket, a propeller, a brake, or any combination thereof.

In one exemplary embodiment, an autonomous or semi-autonomous vehicle 101 comprises a land vehicle configured with a traditional 4-wheeled automotive configuration comprising conventional steering and braking systems. In this embodiment, the drive train may be configurable for standard 2-wheel drive or 4-wheel all-terrain traction drive, and the propulsion system may be configurable as a gas engine, a turbine engine, an electric motor and/or a hybrid gas/electric engine.

In some embodiments, the autonomous or semi-autonomous vehicle 101 is configured for water travel as a watercraft with a propulsion system comprising a gas engine, a turbine engine, an electric motor and/or a hybrid gas/electric engine, or any combination thereof. In some embodiments, the autonomous or semi-autonomous vehicle 101 is configured for hover travel as an over-land or over-water hovercraft or an air-cushion vehicle (ACV) and is configured with blowers to produce a large volume of air below the hull that is slightly above atmospheric pressure. In some embodiments, the autonomous or semi-autonomous vehicle 101 is configured for air travel as an aerial drone or aerial hovercraft and is configured with wings, rotors, blowers, rockets, and/or propellers and an appropriate brake system.

The autonomous or semi-autonomous vehicle 101 may further comprise an auxiliary solar power system 135 to provide back-up emergency power or power for minor low-power sub-systems. In some embodiments, each autonomous or semi-autonomous vehicle of the autonomous or semi-autonomous vehicle fleet is configured with one or more power sources, such as battery, solar, gasoline, or propane.

Each autonomous or semi-autonomous vehicle 101 in the fleet 100 may comprise a sensor system 170 comprising a plurality of onboard sensors such as, for example, a camera, a video camera, a LiDAR, a radar, an ultrasonic sensor, and a microphone. Each autonomous or semi-autonomous vehicle 101 may further comprise an internal computer 125 for real time navigation and obstacle avoidance, based on the data received by the sensors.

In some embodiments, the autonomous or semi-autonomous vehicles may further comprise an autonomous or semi-autonomous propulsion system sensor 175 configured to monitor drive mechanism performance (e.g., the propulsion engine), power system levels 135 (e.g., battery, solar, gasoline, propane, etc.), monitor drive train performance (e.g., transmission, tires, brakes, rotors, etc.), or any combination thereof.

In some embodiments, the autonomous or semi-autonomous vehicle is further configured to process or manufacture a good. In some embodiments, the autonomous or semi-autonomous vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the autonomous or semi-autonomous vehicle is equipped for financial transactions through debit or credit card readers.

In some embodiments, the autonomous or semi-autonomous vehicle 101 further comprises a digital display for curated content comprising advertisements, marketing promotions, a public service notification, an emergency notification, or any combination thereof.

In some embodiments, the autonomous or semi-autonomous vehicle 101 has a driving speed of about 1 miles per hour (mph) to about 90 mph, to accommodate inner-city, residential, and intrastate or interstate driving. In some embodiments, the autonomous or semi-autonomous vehicle fleet is configured for land travel. In some embodiments, each autonomous land vehicle in the fleet is configured with a working speed range from 13.0 mph to 45.0 mph. In some embodiments, the autonomous land vehicles in the fleet are configured with a maximum speed range from 13.0 mph to about 90.0 mph. In some embodiments, the autonomous or semi-autonomous vehicle fleet is configured for water travel as a watercraft and is configured with a working speed range from 1.0 mph to 45.0 mph. In some embodiments, the autonomous or semi-autonomous vehicle fleet is configured for hover travel as an over-land or over-water hovercraft and is configured with a working speed range from 1.0 mph to 60.0 mph. In some embodiments, the autonomous or semi-autonomous vehicle fleet is configured for air travel as an aerial drone or aerial hovercraft and is configured with a working speed range from 1.0 mph to 80.0 mph.

Communications Module

Each autonomous or semi-autonomous vehicle 101 may comprise a communication module 160 configurable to receive and send data from the fleet management module 120, and the user. In some embodiments the data is related user interactions and autonomous or semi-autonomous vehicle fleet interactions, comprising: scheduled requests or orders, on-demand requests or orders, or a self-positioning request. In some embodiments, the communication module 160 receives and sends data via wireless transmission. In some embodiments, the wireless transmission occur via a mobile application on an electronic device via a central server, a fleet management module, a mesh network, cellular communication (e.g., 3G, 4G, and 5G), satellite communications, or any combination thereof. In some embodiments, the electronic device comprises a phone, a personal mobile device, a personal digital assistant (PDA), a mainframe computer, a desktop computer, a laptop computer, a tablet computer, and/or wearable computing device comprising: a communication headset, smart glasses, a contact lens or lenses, a digital watch, a bracelet, a ring, a jewelry, or a combination thereof.

In some embodiments, business 204 and customers 202 communicate with the fleet operator 200 through their own app/interface. In some embodiments, each autonomous or semi-autonomous vehicle 101 further comprises a memory device to store the data for future data transfer or manual download.

Securable Compartments

Figure 8:
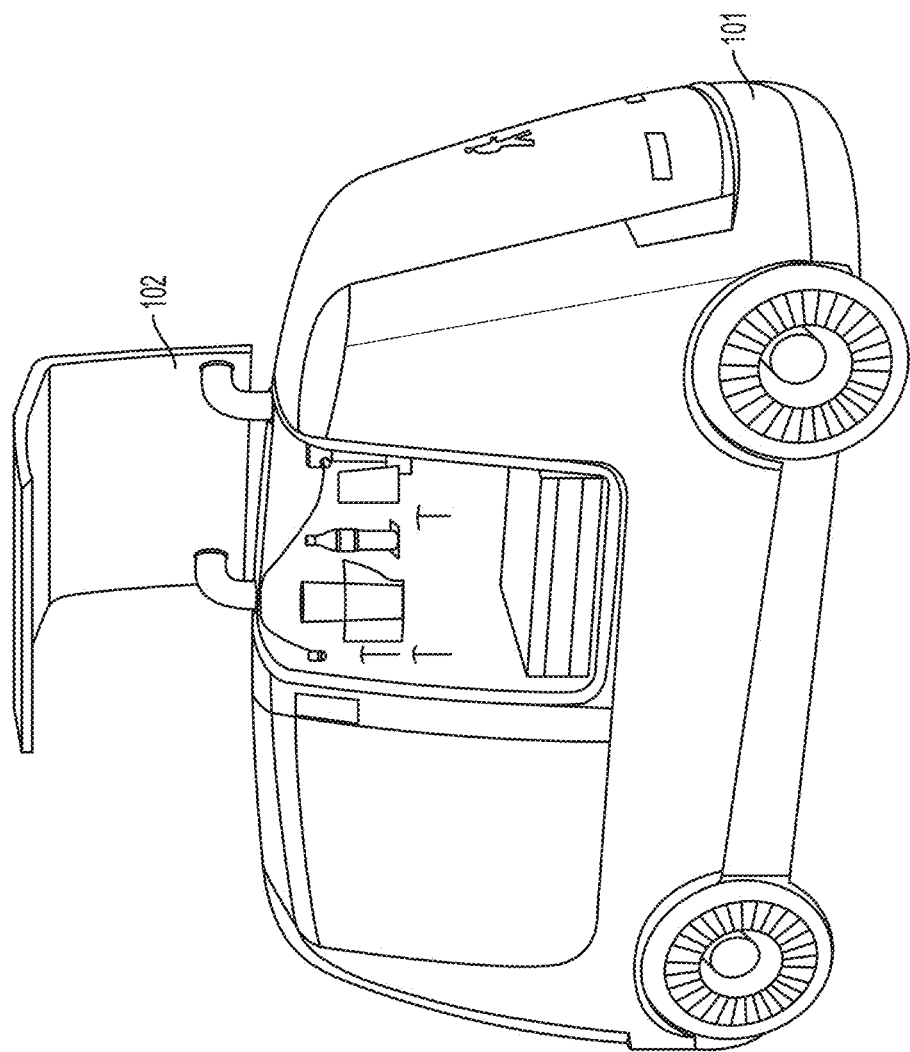
FIG. 8 is a perspective view of an exemplary pizza delivery autonomous or semi-autonomous vehicle, in accordance with some embodiments.
Figure 9:
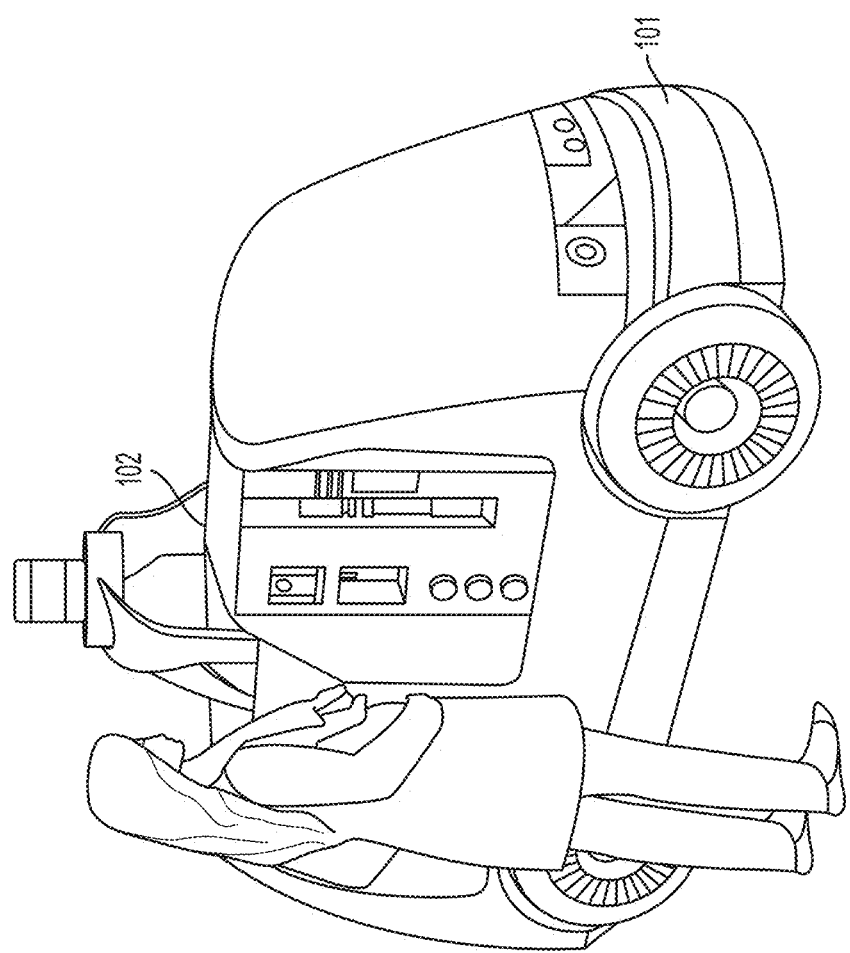
FIG. 9 is a perspective view of an exemplary coffee delivery autonomous or semi-autonomous vehicle, in accordance with some embodiments.
Figure 10:
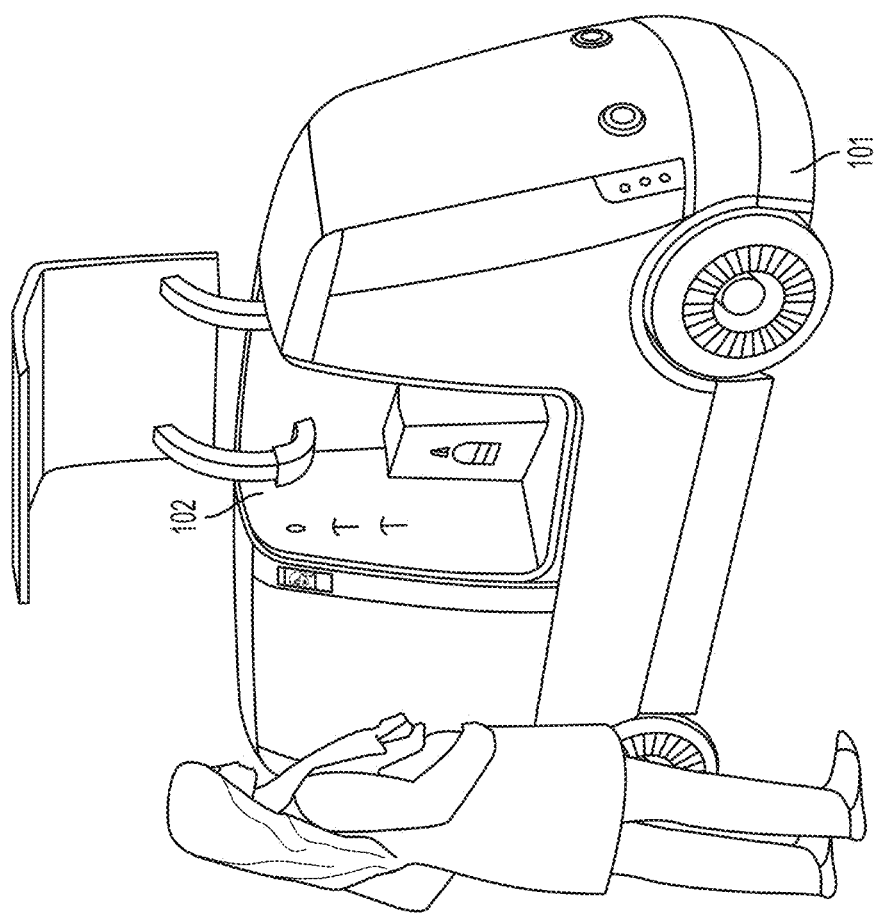
FIG. 10 is a perspective view of an exemplary meal delivery autonomous or semi-autonomous vehicle comprising a lighted interior, in accordance with some embodiments.

As illustrated in FIGS. 7-11, in some embodiments, the plurality of compartments may be humidity and/or temperature controlled for: hot goods; cold goods; wet goods; dry goods, or combinations thereof. In some embodiments, the plurality of securable compartments are configurable for a plurality of goods. Exemplary compartments and goods comprise: bookshelves for books; thin drawers for documents; larger box-like drawers for packages, sized compartments for vending machines, embedded coffee makers, pizza ovens, and dispensers. In some embodiments, the plurality of securable compartments can be configured and reconfigured based on: anticipated demands, patterns of behaviors, area of service, the types of goods to be transported, or any combination thereof. Alternately, the compartments may be configured to contain a set of goods to form a mobile marketplace (similar to a mini bar at a hotel). Further, as illustrated in FIGS. 8-10, the compartment may further comprise various additional amenities such as lights for night deliveries, condiment dispensers, and display screens. In some embodiments, the plurality of securable compartments are set up for rolling food trucks. In some embodiments, the plurality of securable compartments are set up for rolling pharmacies. In some embodiments, the plurality of securable compartments are set up for rolling first aid kits. One or more of the compartments may be configured with the same size, the same shape, or both. One or more of the compartments may be configured with the different sizes, shapes, or both. Each compartment may comprise one or more inserts to secure at least one of the first item and the second item.

Figure 11A:
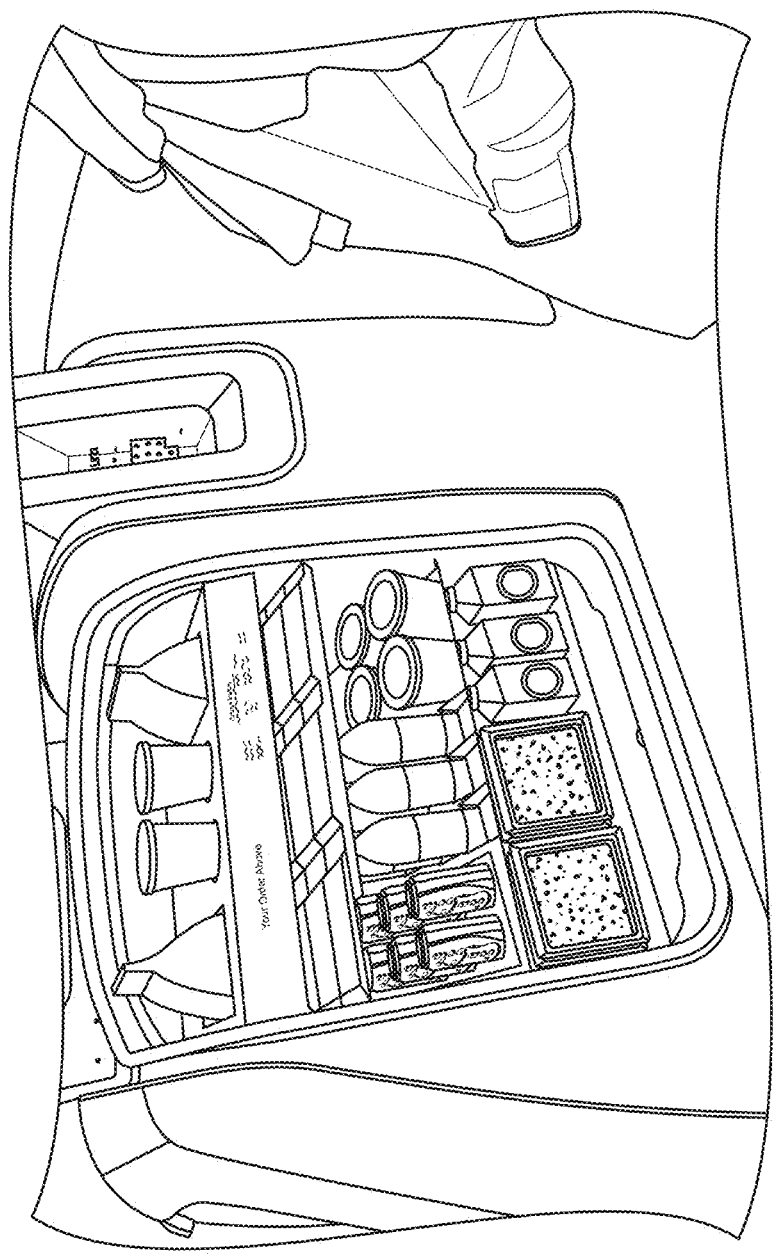
FIG. 11A is a perspective view of an exemplary vending autonomous or semi-autonomous vehicle, in accordance with some embodiments.
Figure 11B:
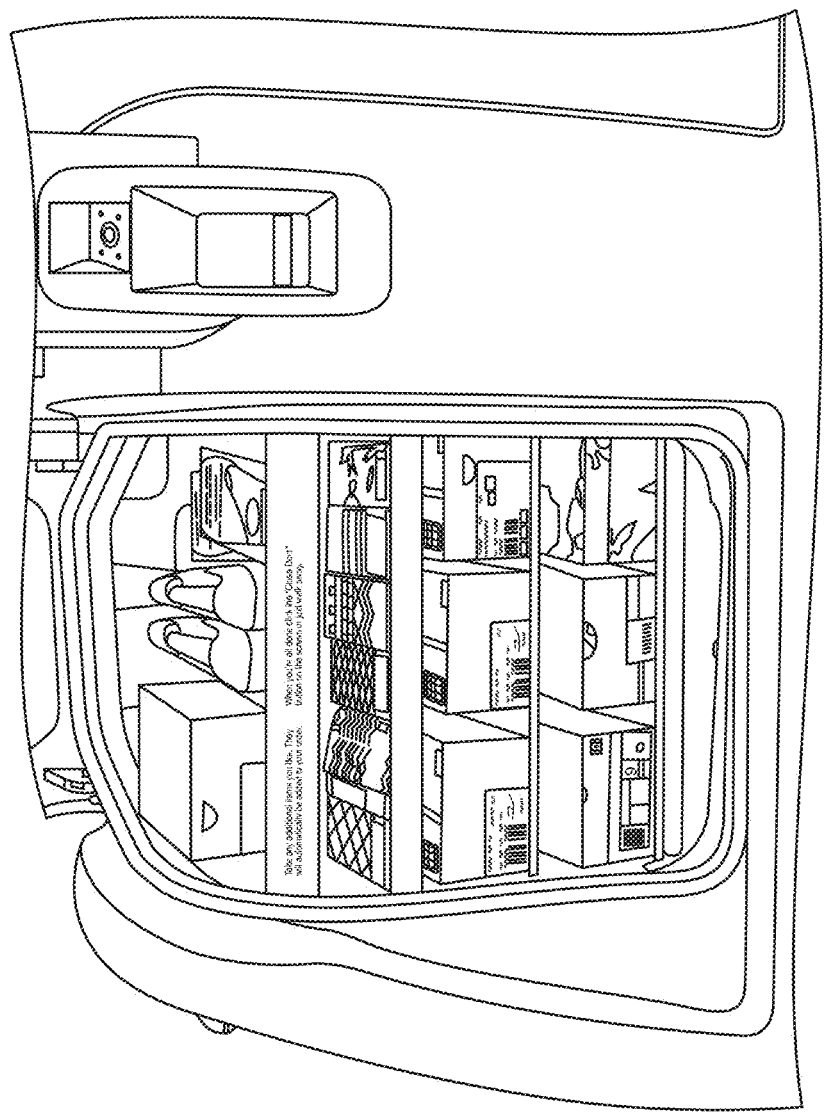
FIG. 11B is a perspective view of another exemplary vending autonomous or semi-autonomous vehicle, in accordance with some embodiments.

One aspect provided herein is, per FIG. 11A, is an autonomous or semi-autonomous vehicle 101 for delivering a second item 1120 to a customer, the autonomous or semi-autonomous vehicle 101 comprising a first compartment 1111, a second compartment 1121, and an input device 1140. In some embodiments, the first compartment 1111 is configured to contain, secure, and vend a first item 1110. In some embodiments, the second compartment 1121 is configured to contain, secure, and vend the second item 1120. In some embodiments, the second compartment 1121 comprises a sensor 1130 configured to detect a presence of the second item 1120. In some embodiments the input device 1140 is configured to receive a selection of the second item 1120 by a customer. In some embodiments, the autonomous or semi-autonomous vehicle 101 further comprises an autonomous or semi-autonomous propulsion system.

In some embodiments, the autonomous or semi-autonomous vehicle 101 further comprises a non-transitory computer-readable storage media encoded with a computer program including instructions executable by a processor to create an application comprising: an ordering module, a prediction module, a delivery module, a first vending module, a second vending module, and a confirmation module. In some embodiments, the ordering module is configured to receive an order for the first item from a customer. In some embodiments, the prediction module configured to determine the second item 1120 based at least on the first item 1110 and a customer data associated with the customer. In some embodiments, the prediction module is further configured to send a loading instruction based on the second item 1120. In some embodiments, the delivery module controls the autonomous or semi-autonomous propulsion system to direct the autonomous or semi-autonomous vehicle 101 to a location of the customer. In some embodiments, the first vending module directs the first compartment 1111 to vend the first item 1110. In some embodiments, the second vending module directs the second compartment 1121 to vend the second item 1120 based on the selection. In some embodiments, the confirmation module determines that the second item 1120 has been vended based at least on the detection of the presence of the second item 1120. In some embodiments the application further comprises a payment module configured to charge the customer based on the vending of the first item, the presence of the second item, or both. In some embodiments the first compartment comprises a sensor configured to detect a presence of the first item.

In some embodiments the input device comprises a button, a touchscreen, a Bluetooth sensor, a wireless network device, a cellular network device, a camera, a USB input, a keyboard, or any combination thereof. In some embodiments the first compartment is configured to contain, secure, and vend 2 or more first items. In some embodiments the second compartment is configured to contain, secure, and vend 2 or more second items. In some embodiments at least the first item and the second item is associated with a unique identifier. In some embodiments, the sensor is configured to detect the presence of the second item based on the unique identifier. In some embodiments the sensor comprises at least one of a thermometer, a barcode scanner, an RFID reader, a scale, a pressure sensor, a switch, and a camera. In some embodiments vending the first item comprises unlocking a door of the first compartment, opening a door of the first compartment, releasing the first item from the first compartment, or any combination thereof. In some embodiments vending the second item comprises unlocking a door of the second compartment, opening a door of the second compartment, releasing the second item from the second compartment, or any combination thereof.

In some embodiments, the autonomous or semi-autonomous vehicle further comprises a communication device configured to receive an instruction from a fleet management module. In some embodiments the instruction comprises at least one of the first item, the second item, the location of the customer, and an identity of the customer. In some embodiments, the autonomous or semi-autonomous vehicle further comprises at least one of an energy storage device, and an energy collection device. In some embodiments, the autonomous or semi-autonomous vehicle further comprises a screen configured to display a media. In some embodiments the media comprises a media associated with the first item, a media associated with the second item, a price associated with the first item, a price associated with the second item, the selection, the order, the presence of the second item, the location of the customer, an identity of the customer, or any combination thereof. In some embodiments the prediction module is configured to determine the second item based at least on the first item and the customer data associated with the customer by a machine learning algorithm.

In some embodiments, an algorithm is used to determine the second item to stock with each order based on the current order, a customer's past purchasing history, or other aggregate purchasing behaviors of customers similar to the current customer based on demographics, locations, type of purchases, or other factors. In some cases, the second item comprises a complementary product, a product variety, a product option, or any combination thereof.

In some embodiments, the second item determined by the algorithm is loaded onto the autonomous or semi-autonomous vehicle by a person or automated loading system.

At least one of the autonomous or semi-autonomous vehicle and the compartment may comprise a controller 150 configured to associate each one of the plurality of securable compartments 102, 104 to an assigned customer 202 or provider 204 and provide entry to the securable compartments 102, 104 upon authorization. Each securable compartments 102, 104 may be secured separately to transport goods to separate sets of customers 202. As such, the autonomous or semi-autonomous vehicle may deliver a first good or service to a first assigned customer from within a first securable compartment 102, 104 and then deliver a second good or service to a second assigned customer from within the securable compartment 102, 104.

Upon arrival of the autonomous or semi-autonomous vehicle to the customer destination, the customer may open their respective compartment(s) by verifying their identity. In one embodiment, the customer verifies their identity by providing a PIN (e.g., 4 digit number) via a touchscreen or a keypad within the autonomous or semi-autonomous vehicle, which they received upon initial request/order. The customer can verify themselves using their mobile phone and an RFID reader on the autonomous or semi-autonomous vehicle. Alternatively, the customer is verified through voice recognition of a keyword or key-phrase, wherein the autonomous or semi-autonomous vehicle comprises a microphone and a voice recognition application for recognition thereof. Further, in another embodiment, the customer is verified through facial or identification recognition, wherein the autonomous or semi-autonomous vehicle comprises a camera and a facial recognition application for recognition thereof. Additionally or alternatively, the customer is verified through a magnetic strip, RFID key or any other computer readable form of identification. Finally, in another embodiment, the customer is verified by entering a code or identification value on their mobile device, wherein the autonomous or semi-autonomous vehicle receives a cellular signal comprising a confirmation of the user or data related to the code of identification of the user.

In some embodiments, the vehicle could be configured for water travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for hover travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for aerial drone or aerial hover travel, providing at least one and preferably two large storage compartments, and more preferably, at least one large compartment is configured with a plurality of smaller internal secure compartments of variable configurations to carry individual items that are to be delivered to, or need to be retrieved from customers.

Operating Environments

The autonomous or semi-autonomous vehicles 101 in the fleet 100 may be configured to operate within a variety of unstructured open operating environments to enable service to a broad range of locations.

In some embodiments, the unstructured open environment is a non-confined geographic region accessible by navigable pathways comprising: public roads; private roads; bike paths; open fields, open public lands, open private lands, pedestrian walkways, lakes, rivers, or streams.

In some embodiments, the closed environment is a confined, enclosed, or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the unstructured open environment is a non-confined airspace or even near-space environment which includes all main layers of the Earth's atmosphere comprising the troposphere, the stratosphere, the mesosphere, thermosphere and the exosphere. In some embodiments, the navigation module controls routing of the conveyance system of the vehicles in the fleet in the unstructured open or closed environments.

Goods and Services

In some embodiments, the user comprises a fleet manager, a sub-contracting vendor, a service provider, a customer, a business entity, an individual, or a third party.

In some embodiments, the services comprises a subscription service, a prescription service, a marketing service, an advertising service, a notification service, a requested service, an ordered service, a scheduled delivery service, or any combination thereof. For example, the scheduled delivery services may include special repeat deliveries such as groceries, prescriptions, drinks, mail, documents, or any combination thereof.

In some embodiments, the services alternatively or further comprise a return of a good (e.g., a signed document), receiving one set of goods and returning a different set of goods (e.g., product replacement/returns, groceries, merchandise, books, recording, videos, movies, payment transactions, etc.), or a third party user providing instruction and or authorization to a goods or service provider to prepare, transport, deliver and/or retrieve goods to a principle user in a different location. In some embodiments, the services further or alternatively comprise: advertising services, land survey services, patrol services, monitoring services, traffic survey services, signage and signal survey services, architectural building, or road infrastructure survey services.

In some embodiments, the service further or alternatively comprises processing or manufacturing a good. In some embodiments, the autonomous or semi-autonomous vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the service comprises a financial transaction.

In some embodiments, the service comprises advertising, marketing, public safety, public service, or any combination thereof.

Controller(s) and Processor(s)

In some embodiments, each autonomous or semi-autonomous vehicle in the autonomous or semi-autonomous vehicle fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each autonomous or semi-autonomous vehicle in the autonomous or semi-autonomous vehicle fleet is equipped with a controller 150 configurable to associate each one of the plurality of securable compartments 102, 104 to an assignable customer 202 or provider 204 and provide entry when authorized.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, WindowsServer®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm®

WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
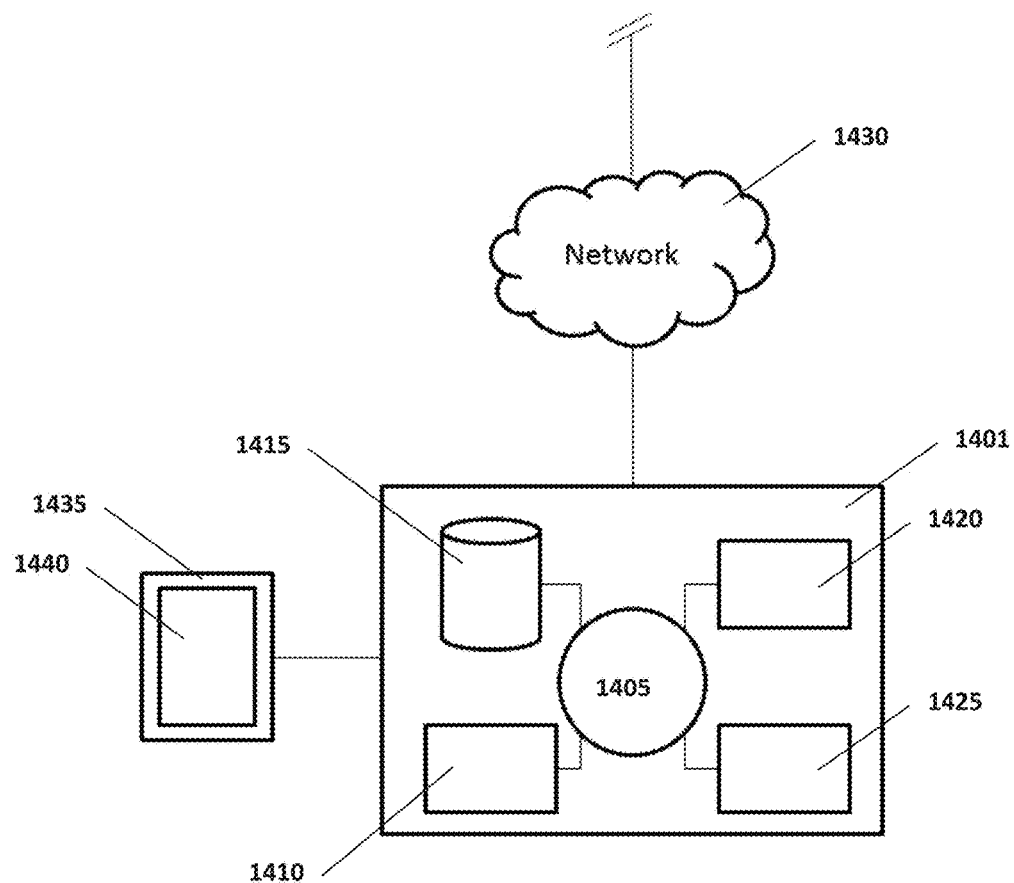
FIG. 14 shows a non-limiting schematic diagram of a digital processing device; in this case, a device with one or more CPUs, a memory, a communication interface, and a display.

Referring to FIG. 14, in a particular embodiment, a digital processing device 1401 is programmed or otherwise configured to managing autonomous or semi-autonomous vehicles. The device 1401 is programmed or otherwise configured to manage autonomous or semi-autonomous vehicles. In this embodiment, the digital processing device 1401 includes a central processing unit (CPU, also "processor" and "computer processor" herein) 1405, which is optionally a single core, a multi core processor, or a plurality of processors for parallel processing. The digital processing device 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 comprises a data storage unit (or data repository) for storing data. The digital processing device 1401 is optionally operatively coupled to a computer network ("network") 1430 with the aid of the communication interface 1420. The network 1430, in various cases, is the internet, an internet, and/or extranet, or an intranet and/or extranet that is in communication with the internet. The network 1430, in some cases, is a telecommunication and/or data network. The network 1430 optionally includes one or more computer servers, which enable distributed computing, such as cloud computing. The network 1430, in some cases, with the aid of the device 1401, implements a peer-to-peer network, which enables devices coupled to the device 1401 to behave as a client or a server.

Continuing to refer to FIG. 14, the CPU 1405 is configured to execute a sequence of machine-readable instructions, embodied in a program, application, and/or software. The instructions are optionally stored in a memory location, such as the memory 1410. The instructions are directed to the CPU 105, which subsequently program or otherwise configure the CPU 1405 to implement methods of the present disclosure. Examples of operations performed by the CPU 1405 include fetch, decode, execute, and write back. The CPU 1405 is, in some cases, part of a circuit, such as an integrated circuit. One or more other components of the device 1401 are optionally included in the circuit. In some cases, the circuit is an application specific integrated circuit (ASIC) or a field programmable gate array (FPGA).

Continuing to refer to FIG. 14, the storage unit 1415 optionally stores files, such as drivers, libraries and saved programs. The storage unit 1415 optionally stores user data, e.g., user preferences and user programs. The digital processing device 1401, in some cases, includes one or more additional data storage units that are external, such as located on a remote server that is in communication through an intranet or the internet.

Continuing to refer to FIG. 14, the digital processing device 1401 optionally communicates with one or more remote computer systems through the network 1430. For instance, the device 1401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 1410 or electronic storage unit 1415. The machine executable or machine readable code is optionally provided in the form of software. During use, the code is executed by the processor 1405. In some cases, the code is retrieved from the storage unit 1415 and stored on the memory 1410 for ready access by the processor 1405. In some situations, the electronic storage unit 1415 is precluded, and machine-executable instructions are stored on the memory 1410.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 15:
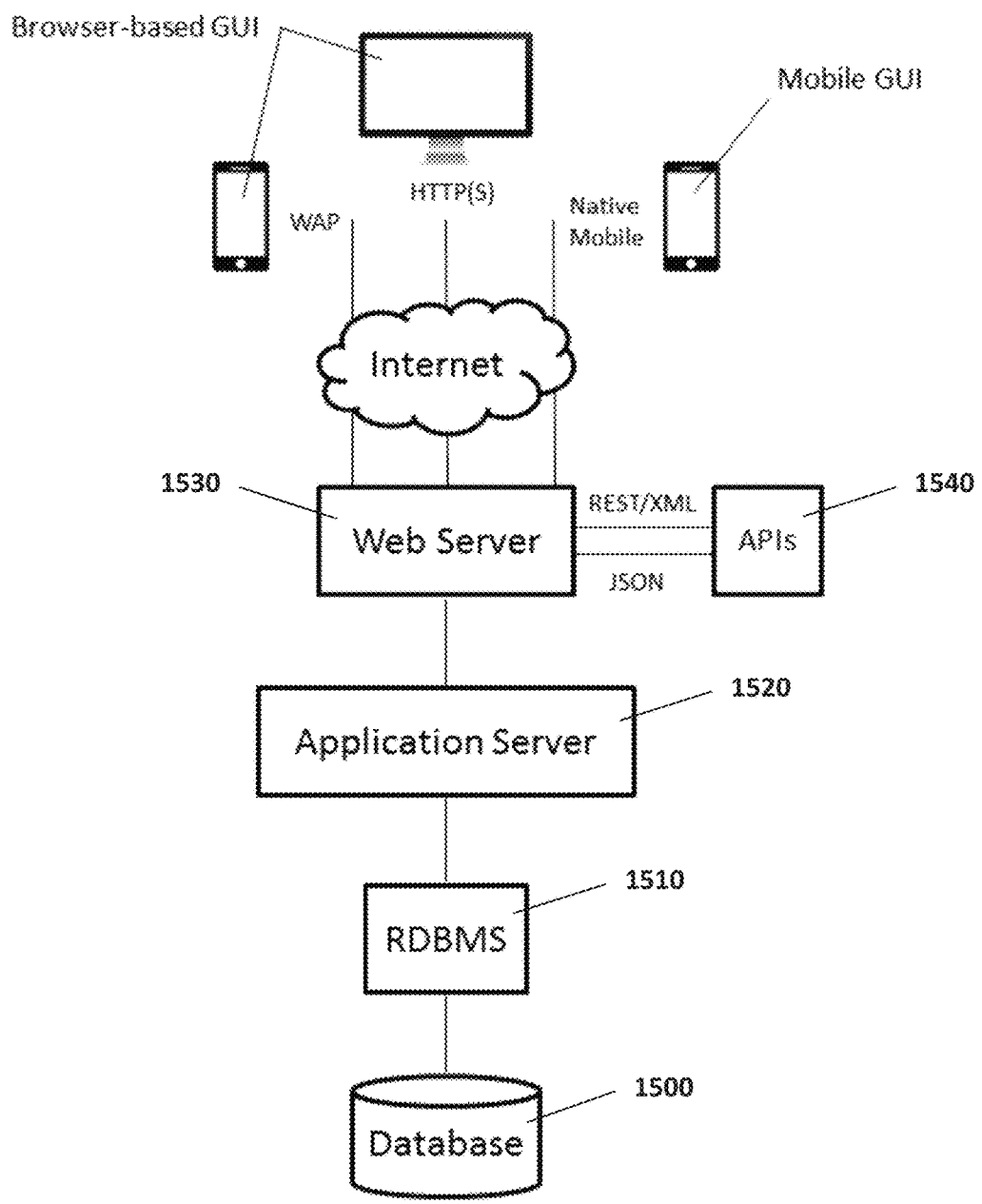
FIG. 15 shows a non-limiting schematic diagram of a web/mobile application provision system; in this case, a system providing browser-based and/or native mobile user interfaces.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the internet, the system provides browser-based and/or mobile native user interfaces.

Figure 16:
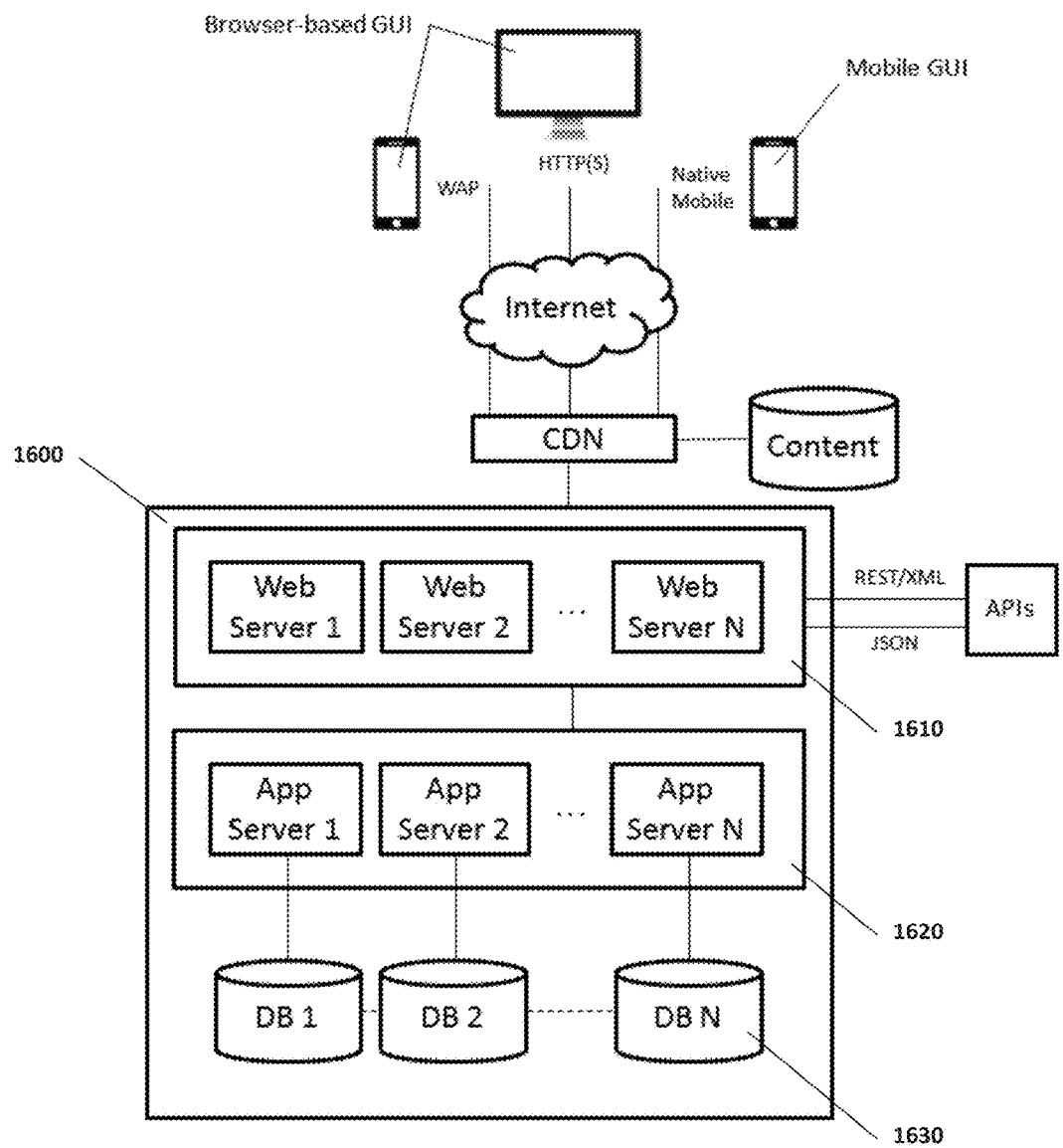
FIG. 16 shows a non-limiting schematic diagram of a cloud-based web/mobile application provision system; in this case, a system comprising an elastically load balanced, auto-scaling web server and application server resources as well synchronously replicated databases.

Referring to FIG. 16, in a particular embodiment, an application provision system alternatively has a distributed, cloud-based architecture 1600 and comprises elastically load balanced, auto-scaling web server resources 1610, and application server resources 1620 as well synchronously replicated databases 1630.

Figure 17:
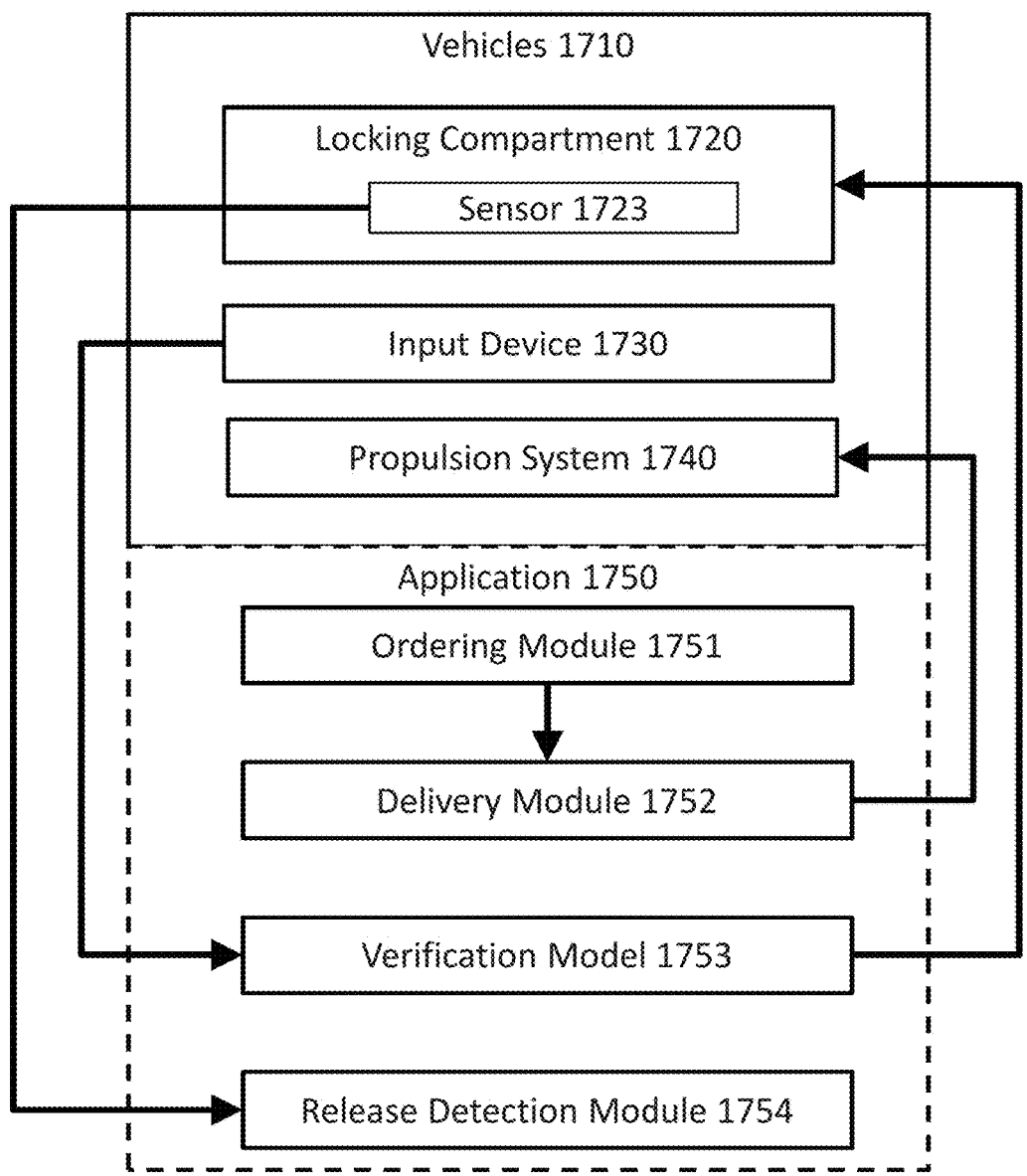
FIG. 17 shows a non-limiting schematic diagram of a platform for autonomously or semi-autonomously delivering a second item to a customer.

Platform for Autonomously or Semi-Autonomously Delivering a Second Item to a Customer Provided herein per FIG. 17, is a platform for autonomously or semi-autonomously delivering a second item to a customer, the platform comprising: an autonomous or semi-autonomous vehicle 1710 and a non-transitory computer-readable storage media encoded with a computer program including instructions executable by a processor to create an application 1750.

The autonomous or semi-autonomous vehicle 1710 may comprise a locking compartment 1720, an input device 1730, and an autonomous or semi-autonomous or semi-autonomous propulsion system 1740.

The locking compartment 1720 may be configured to contain and secure at least one of a first item and at least one of a second item. The compartment 1720 may comprise a sensor 1723 configured to detect an absence of at least one of the first item and the second item. In some embodiments, the sensor 1723 comprises at least one of a thermometer, a barcode scanner, an RFID reader, a scale, a pressure sensor 1723, a switch, and a camera. In some embodiments, the locking compartment 1720 is configured to contain and secure 2 or more first items, 2 or more second items, or both. In some embodiments, the locking compartment 1720 further comprises a vending mechanism configured to vend at least one of the first item and the second item. In some embodiments, the first item comprises a plurality of first items. In some embodiments the second item comprises a plurality of second items, or both.

The input device 1730 may be configured to receive at least one of a customer verification and a selection of the second item by the customer. In some embodiments, the input device 1730 comprises Wi-Fi input device 1730, a Bluetooth input device 1730, a cellular input device 1730, a button, a touchscreen, a camera, a USB input, a keyboard, or any combination thereof.

The application 1750 may comprise an ordering module 1751, a delivery module 1752, a customer verification module 1753, and a release detection module 1754. In some embodiments, at least a portion of the application 1750 is performed aboard the vehicle. In some embodiments, the processor resides aboard the vehicle.

The ordering module 1751 may be configured to receive an order from the customer. The order may comprise the first item and a customer location.

The delivery module 1752 may control the autonomous or semi-autonomous propulsion system 1740. The delivery module 1752 may control the autonomous or semi-autonomous propulsion system 1740 to direct the autonomous or semi-autonomous vehicle 1710 to the customer location.

The customer verification module 1753 may confirm an identity of the customer. The customer verification module 1753 may confirm an identity of the customer based on the customer verification. The customer verification module 1753 may further unlock the locking compartment 1720. The customer verification module 1753 may unlock the locking compartment 1720 based on the confirmation of the identity of the customer.

The release detection module 1754 may determine that first item has been removed from the compartment 1720. The release detection module 1754 may determine that first item has been removed from the compartment 1720 based on the absence of the first item. The release detection module 1754 may further or alternatively determine that second item has been removed from the compartment 1720. The release detection module 1754 may further or alternatively determine that second item has been removed from the compartment 1720 based on the absence of the second item.

In some embodiments, the application 1750 further comprises a database module. The database may comprise a customer data. The customer data may be associated with the customer. The application 1750 may further comprise a prediction module. The prediction module may be configured to determine the second item. The prediction module may be configured to determine the second item based at least on the first item and the customer data. In some embodiments, the prediction module determines the second item by a machine learning algorithm. In some embodiments, the prediction module is further configured to send a loading instruction to a loading administrator. In some embodiments, the prediction module sends the loading instruction to a loading administrator based on the determination of the second item.

In some embodiments, the database module comprises a plurality of unique identifiers. The plurality of unique identifiers may comprise at least a first identification and a second identification. The first identification may be associated with the first item. The second identification may be associated with the second item. In some embodiments, the first item comprises a first indicator. The first indicator may be associated with the first identification. In some embodiments, the second item comprises a second indicator. The second indicator may be associated with the second identification. In some embodiments, the release detection module 1754 detects that first item has been removed by detecting the first indicator. In some embodiments, the release detection module 1754 detects that second item has been removed by detecting the second indicator.

In some embodiments the platform further comprises a communication device configured to receive an instruction from a fleet management module. In some embodiments, the instruction comprises at least one of the customer location, and the customer verification.

In some embodiments the platform further comprises at least one of an energy storage device, and an energy collection device. In some embodiments the platform further comprises a screen. The screen may be configured to display a media. In some embodiments, the media comprises a media based on the first item, a media associated with the second item, a price associated with the first item, a price associated with the second item, the selection, the order, the absence of the first item, the absence of the second item, the customer location, the customer verification, or any combination thereof.

In some embodiments, the application 1750 further comprises a payment module. The payment module may be configured to charge the customer based on the first item being removed from the compartment 1720, that second item being removed from the compartment 1720, or both.

Locking Compartment

The locking compartment may be configured to contain and secure at least one of a first item and a second item. The locking compartment may comprise a lock comprising a magnet, an actuator, a solenoid, a gear, a pulley, a belt, or any combination thereof. The compartment may comprise a sensor configured to detect an absence of at least one of the first item and the second item. In some embodiments, the locking compartment is configured to contain and secure 2 or more first items, 2 or more second items, or both. In some embodiments, the locking compartment further comprises a vending mechanism configured to vend at least one of the first item and the second item. In some embodiments, the first item comprises a plurality of items. In some embodiments, the second item comprises a plurality of items. The compartment may comprise 2, 3, 4, 5, 6, 8, 10, 12, 15, 20, 25, 30, 40, 50, or more compartments, including increments therein. One or more of the compartments may be configured with the same size, the same shape, or both. One or more of the compartments may be configured with the different sizes, shapes, or both. Each compartment may comprise one or more inserts to secure at least one of the first item and the second item.

Sensor

The sensor configured to detect an absence of at least one of the first item and the second item. In some embodiments, the sensor comprises at least one of a thermometer, a barcode scanner, an RFID reader, a scale, a pressure sensor, a switch, and a camera. The compartment may comprise one or more sensors. The compartment may comprise 2, 3, 4, 5, 6, 8, 10, 12, 15, 20, 25, 30, 40, 50, or more sensors, including increments therein. Two or more sensors may work in parallel to detect the absence of the of the first item, the absence of the second item, or both. The two or more sensors working in parallel may comprise different types of sensors. The two or more sensors working in parallel may comprise two or more sensors that are configured to measure a data associated with the absence of the first item, the second item, or both.

Input Device

The input device may be configured to receive at least one of a customer verification and a selection of the second item by the customer. In some embodiments, the input device comprises Wi-Fi input device, a Bluetooth input device, a cellular input device, a button, a touchscreen, a camera, a USB input, a keyboard, or any combination thereof. In some embodiments, the input device is on the autonomous or semi-autonomous vehicle. In additional embodiments, the input device is configured to receive signal from a user or customer cellular phone. In further embodiments, the input device is configured to connect the user or customer cellular phone with the autonomous or semi-autonomous vehicle. The input device may be configured to prevent fraud, tampering, or both. The input device may receive the customer verification from an administrator, from a registered mobile application associated with the customer, or both. The input device may be further configured to receive a selection of the first item. In additional embodiments, the input device is configured to receive a selection of a plurality of items. The input device may be further configured to receive a payment method. The payment method may comprise a credit card slot, a mobile phone based payment method, or both.

Ordering Module

The ordering module may be configured to receive an order from the customer. The order may comprise the first item and a customer location. The order may comprise one or more of the first items. The order may further comprise a third item, a fourth item, a fifth item or any number of additional items. The customer location may comprise a GPS coordinate, a street address, a cross-street, a locker, or any combination thereof. The ordering module may receive the order from a mobile processor, a server processor, or any combination thereof. The ordering module may associate the first item with a first item price. The ordering module may request an upcharge or fee based on the customer location. The order may further comprise a delivery time or delivery time period.

Delivery Module

The delivery module may control the autonomous or semi-autonomous propulsion system. The delivery module may control the autonomous or semi-autonomous propulsion system to direct the autonomous or semi-autonomous vehicle to the customer location. The delivery module may control the autonomous or semi-autonomous propulsion system to direct the autonomous or semi-autonomous vehicle to the customer location by a route. The delivery module may determine the route to the customer location that is shortest in distance, time, energy expenditure, or any combination thereof. The delivery module may determine the route for two or more orders, wherein the route comprises the customer location for the customer associated with each order. The order may control the autonomous or semi-autonomous propulsion system to direct the autonomous or semi-autonomous vehicle to arrive at the customer location at or during the delivery time period.

Customer Verification Module

The customer verification module may confirm an identity of the customer. The customer verification module may confirm an identity of the customer based on the customer verification. The customer verification module may further unlock the locking compartment. The customer verification module may unlock the locking compartment based on the confirmation of the identity of the customer. The identity of the customer may comprise a name, a birthdate, a social security number, a credit card number, a user account number, a username, a password, a pin, a voice identification, a facial identification, an iris identification, a handprint, a fingerprint, or any combination thereof.

Release Detection Module

The release detection module may determine that first item has been removed from the compartment. The release detection module may determine that first item has been removed from the compartment based on the absence of the first item. The release detection module may determine that first item has been removed from the compartment based on the absence of the first item for a set absence period of time. The set absence period may be 30 seconds, 1 minute, 2 minutes, 3 minutes, 4 minutes, 5 minutes, 10 minutes, 15 minutes, 20 minutes, 30 minutes, or more. The release detection module may determine that first item has been removed from the compartment based on the absence of the first item and once the vehicle, the customer, or both departs.

The release detection module may further or alternatively determine that second item has been removed from the compartment. The release detection module may further or alternatively determine that second item has been removed from the compartment based on the absence of the second item. The release detection module may determine that second item has been removed from the compartment based on the absence of the second item for a set absence period of time. The set absence period may be 30 seconds, 1 minute, 2 minutes, 3 minutes, 4 minutes, 5 minutes, 10 minutes, 15 minutes, 20 minutes, 30 minutes, or more. The release detection module may determine that second item has been removed from the compartment based on the absence of the second item and once the vehicle, the customer, or both departs.

Database Module

The database may comprise a customer data. The customer data may be associated with the customer. In some embodiments, the database module comprises a plurality of unique identifiers. The plurality of unique identifiers may comprise at least a first identification and a second identification. The first identification may be associated with the first item. The second identification may be associated with the second item. In some embodiments, the first item comprises a first indicator. The first indicator may be associated with the first identification. In some embodiments, the second item comprises a second indicator. The second indicator may be associated with the second identification. In some embodiments, the release detection module detects that first item has been removed by detecting the first indicator. In some embodiments, the release detection module detects that second item has been removed by detecting the second indicator. At least one of the first indicator and the second indicator may comprise a barcode, a label, and an RFID chip.

In view of the disclosure provided herein, those of skill in the art will recognize that many databases are suitable for autonomous or semi-autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Prediction Module

The prediction module may be configured to determine the second item. The prediction module may be configured to determine the second item based at least on the first item and the customer data. In some embodiments, the prediction module determines the second item by a machine learning algorithm, a rule based algorithm, or both. In some embodiments, the prediction module may be further configured to send a loading instruction to a loading administrator. In some embodiments, the prediction module sends the loading instruction to a loading administrator based on the determination of the second item. The prediction module may be configured to determine a plurality of second items. The prediction module may be configured to determine a primary second item, a secondary second item different than the first secondary item, or more second items different than the primary second item and the secondary second item. The prediction module may be further configured to determine an upcharge, associated with the second item. The prediction module may be further configured to determine a bundling price plan associated with the first item and the second item.

Communication Device

In some embodiments the platform further comprises a communication device configured to receive an instruction from a fleet management module. In some embodiments, the instruction comprises at least one of the customer location, and the customer verification. The communication device may comprise a wired communication device, a Wi-Fi communication device, a cellular communication device, a Bluetooth communication device, a radio communication device, or any combination thereof. The communication device may comprise a plurality of communication devices. The plurality of communication device may work in series, in parallel, or in a mesh network.

Payment Module

The payment module may be configured to charge the customer based on the first item being removed from the compartment, that second item being removed from the compartment, or both. The payment module may be configured to receive and store a payment method associated with the customer. The payment module may comprise a wireless payment module, credit card payment module, bitcoin payment module or similar payment methods using blockchain, or a cash payment module.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® InternetExplorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for autonomous or semi-autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the terms "fleet," "sub-fleet," and like terms are used to indicate a number of land vehicles, watercraft, or aircraft operating together or under the same ownership. In some embodiments the fleet or sub-fleet is engaged in the same activity. In some embodiments, the fleet or sub-fleet are engaged in similar activities. In some embodiments, the fleet, or sub-fleet are engaged in different activities.

As used herein, the terms "autonomous vehicle," "autonomous vehicle fleet," "vehicle," "all-terrain vehicle," and like terms are used to indicate a mobile machine that transports cargo. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the terms "user," "operator," "fleet operator," and like terms are used to indicate the entity that owns or is responsible for managing and operating the autonomous or semi-autonomous vehicle fleet.

As used herein, the term "customer" and like terms are used to indicate the entity that requests the services provided the autonomous or semi-autonomous vehicle fleet.

As used herein, the terms "provider," "business," "vendor," "third party vendor," and like terms are used to indicate an entity that works in concert with the fleet owner or operator to utilize the services of the autonomous or semi-autonomous vehicle fleet to deliver the provider's product from and or return the provider's product to the provider's place of business or staging location.

As used herein, the terms "server," "computer server," "central server," "main server," and like terms are used to indicate a computer or device on a network that manages the fleet resources, namely the autonomous or semi-autonomous vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the autonomous or semi-autonomous vehicle such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn comprises software modules. In software, a module is a part of a program. Programs are composed of one or more independently developed modules that are not combined until the program is linked. A single module can contain one or several routines, or sections of programs that perform a particular task. As used herein the fleet management module comprises software modules for managing various aspects and functions of the autonomous or semi-autonomous vehicle fleet.

As used herein, the terms "processor," "digital processing device," and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, WindowsServer®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

Example—Upselling a Baseball Mitt when Customer Purchases a Baseball Bat Using an Autonomous Vehicle In one example, an ordering module of the platform receives an order from Sam for a baseball bat to 123 A Street. The prediction module determines that given Sam's order and purchase history, he may also want to purchase a baseball mitt. The delivery module then controls the autonomous or semi-autonomous propulsion system of one or more of the autonomous or semi-autonomous vehicle to deliver the baseball bat and the baseball mitt to 123 A Street. Once the vehicle arrives at 123 A Street, the customer verification module confirms that the person waiting to pick up the order is in-fact Sam. The customer verification module then unlocks the locking compartment. Sam removes the baseball bat and decides to keep it. Sam then removes and inspects the baseball mitt, decides not to purchase the mitt and returns it to the compartment. A release detection module determines that the baseball bat has been removed based on an absence of the baseball bat, and determines that the baseball mitt has been returned and is not absent. The payment module then charges Sam for the price of the baseball bat.

What is claimed is:
1. A platform for autonomously or semi-autonomously upselling an unordered item to a customer, the platform comprising:
   a) an autonomous or semi-autonomous vehicle comprising:
     (i) a locking compartment configured to contain and secure at least an item ordered by the customer and at least an item unordered by the customer, wherein the locking compartment comprises a sensor configured to detect an absence of at least one of the ordered item and the unordered item;

(ii) an input device configured to receive at least one of a customer verification and a selection of the unordered item by the customer; and (iii) an autonomous or semi-autonomous propulsion system; and b) the platform further comprising a non-transitory computer-readable storage media encoded with a computer program including instructions executable by a processor to create an application comprising:

(i) an ordering module configured to receive an order from the customer, the order comprising the ordered item and a customer location;

(ii) a delivery module controlling the autonomous or semi-autonomous propulsion system to direct the autonomous or semi-autonomous vehicle to the customer location; and (iii) a customer verification module confirming an identity of the customer based on the customer verification and unlocking the locking compartment based on the confirmation of the identity of the customer; and (iv) a release detection module determining that the ordered item has been removed from the compartment based on the absence of the ordered item, determining that the unordered item has been removed from the compartment based on the absence of the unordered item, or both.

2. The platform of claim 1, wherein the sensor comprises at least one of a barcode scanner, an RFID reader, a scale, a pressure sensor, a switch, and a camera.

3. The platform of claim 1, wherein the input device comprises a Wi-Fi input device, a Bluetooth input device, a cellular input device, a button, a touchscreen, a camera, a USB input, a keyboard, or any combination thereof.

4. The platform of claim 1, wherein the application further comprises a database module.

5. The platform of claim 4, wherein the database comprises a customer data associated with the customer, and wherein the application further comprises a prediction module configured to determine the unordered item based at least on the ordered item and the customer data.

6. The platform of claim 5, wherein the prediction module determines the unordered item by a machine learning algorithm.

7. The platform of claim 5, wherein the prediction module is further configured to send a loading instruction to a loading administrator based on the determination of the unordered item.

8. The platform of claim 4, wherein the database module comprises a plurality of unique identifiers comprising at least a first identification and a second identification, wherein the first identification is associated with the ordered item, and wherein the second identification is associated with the unordered item.

9. The platform of claim 8, wherein the ordered item comprises a first indicator associated with the first identification, the unordered item comprises a second indicator associated with the second identification, or both.

10. The platform of claim 9, wherein the release detection module detects that the ordered item has been removed by detecting the first indicator and release detection module detects that the unordered item has been removed by detecting the second indicator.

11. The platform of claim 1, wherein the locking compartment is configured to contain and secure 2 or more ordered items, 2 or more unordered items, or both.

12. The platform of claim 1, wherein the locking compartment further comprises a vending mechanism configured to vend at least one of the ordered item and the unordered item.

13. The platform of claim 1, further comprising a communication device configured to receive an instruction from a fleet management module.

14. The platform of claim 13, wherein the instruction comprises at least one of the customer location, and the customer verification.

15. The platform of claim 1, further comprising at least one of an energy storage device, and an energy collection device.

16. The platform of claim 1, further comprising a screen configured to display a media.

17. The platform of claim 16, wherein the media comprises a media based on the ordered item, a media associated with the unordered item, a price associated with the ordered item, a price associated with the unordered item, the selection, the order, the absence of the ordered item, the absence of the unordered item, the customer location, the customer verification, or any combination thereof.

18. The platform of claim 1, wherein the application further comprises a payment module configured to charge the customer based on the ordered item being removed from the compartment, that the unordered item being removed from the compartment, or both.

19. The platform of claim 1, wherein at least a portion of the application is performed aboard the vehicle.

20. The platform of claim 1, wherein the processor resides aboard the vehicle.

21. The platform of claim 1, wherein the ordered item comprises a plurality of ordered items, the unordered item comprises a plurality of unordered items, or both.

22. The platform of claim 1, wherein the autonomous or semi-autonomous vehicle further comprises a vehicle length greater than a vehicle height.

23. The platform of claim 1, wherein the locking compartment comprises an ordered section and an unordered section, wherein the ordered section is configured to contain and secure the ordered item, wherein the unordered section is configured to contain and secure the unordered item.

* * * * *